Patented May 26, 1936

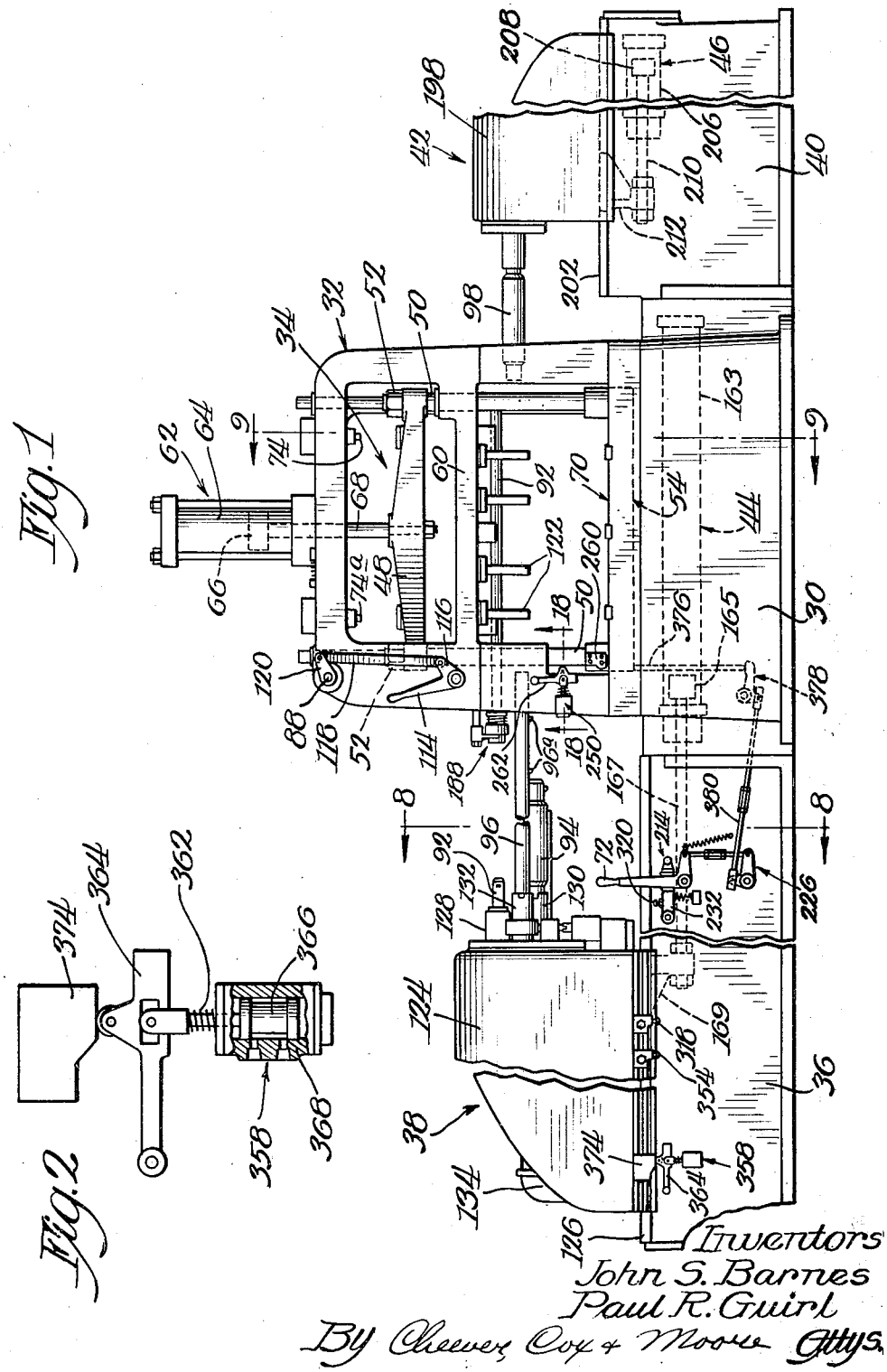

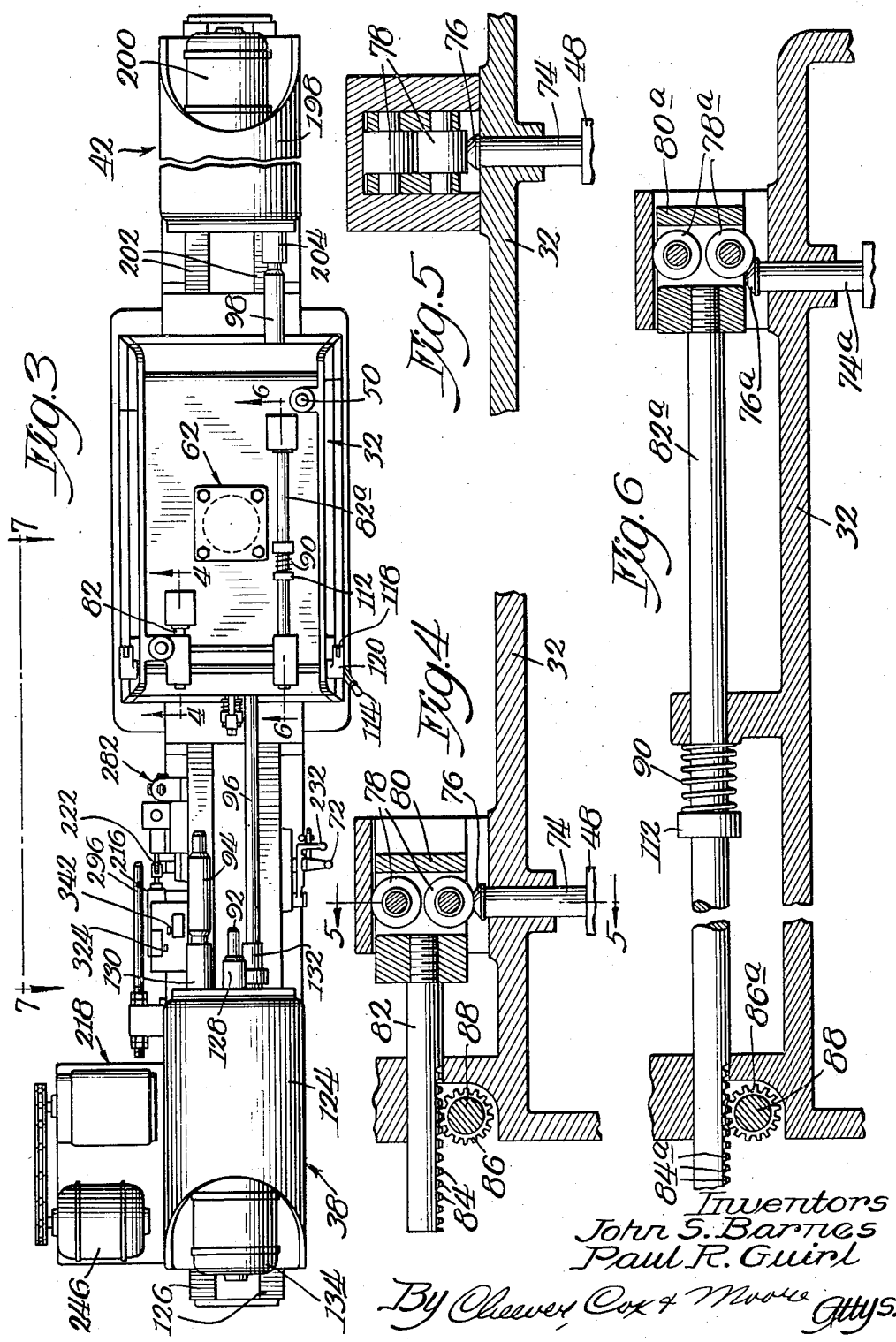

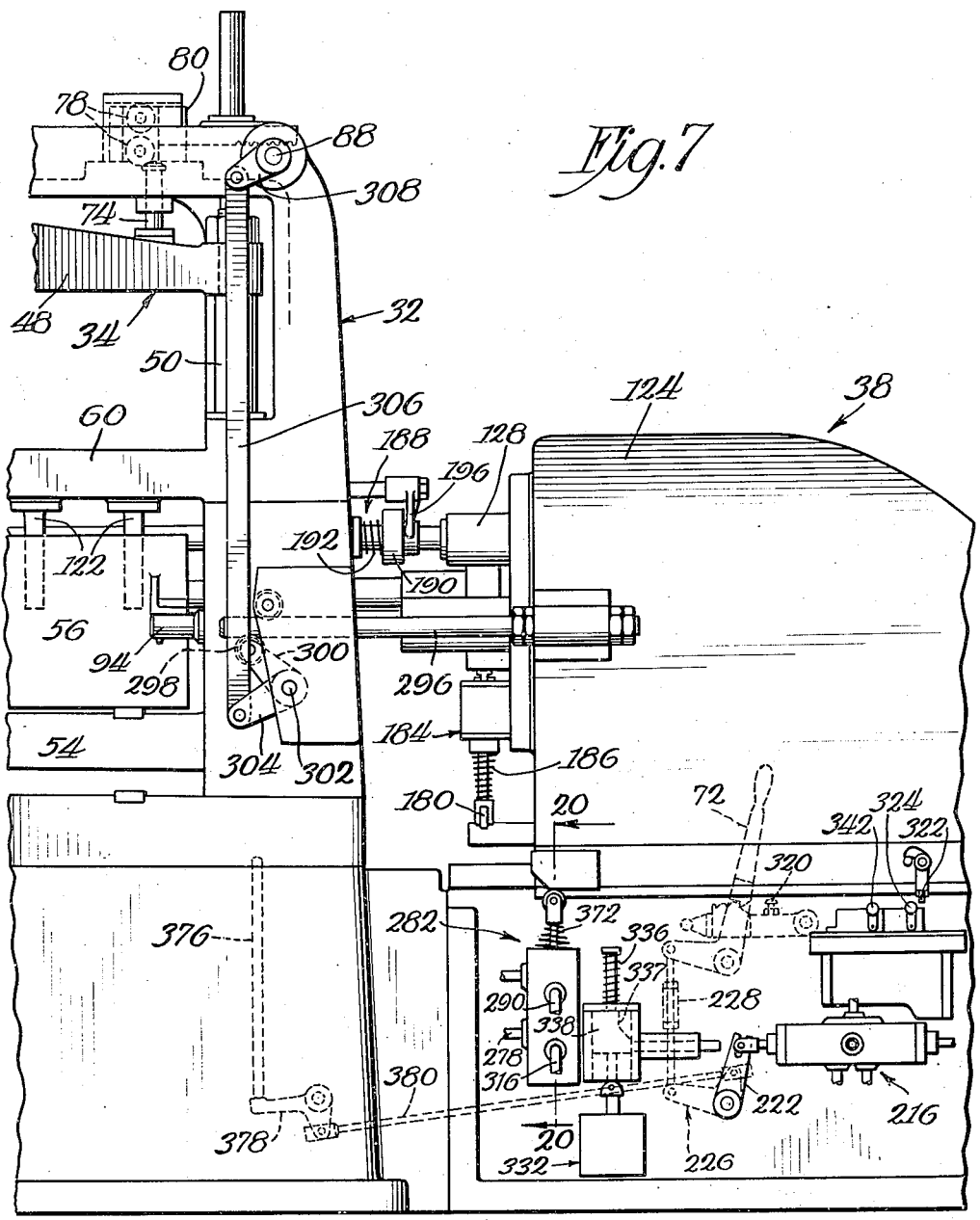

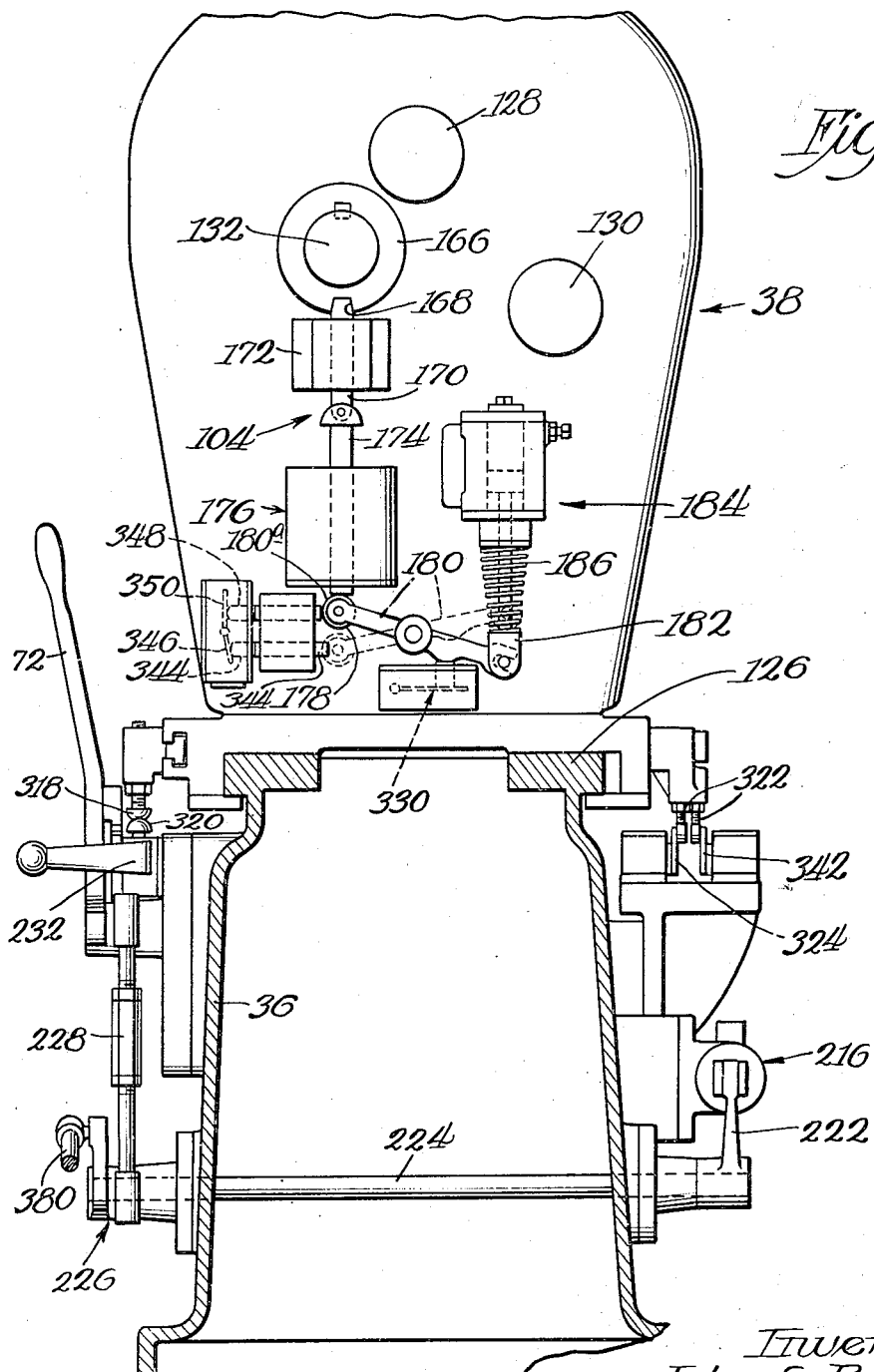

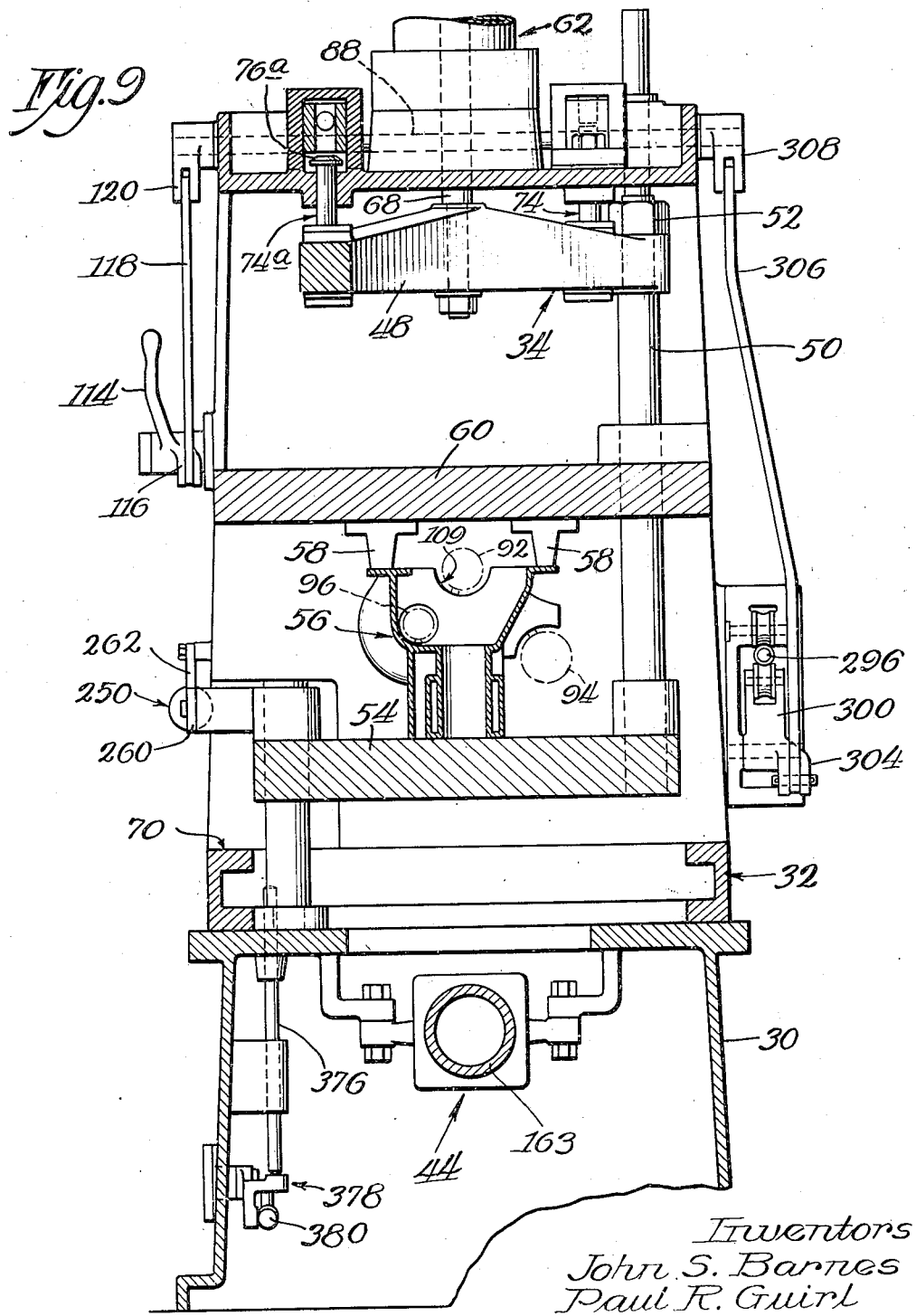

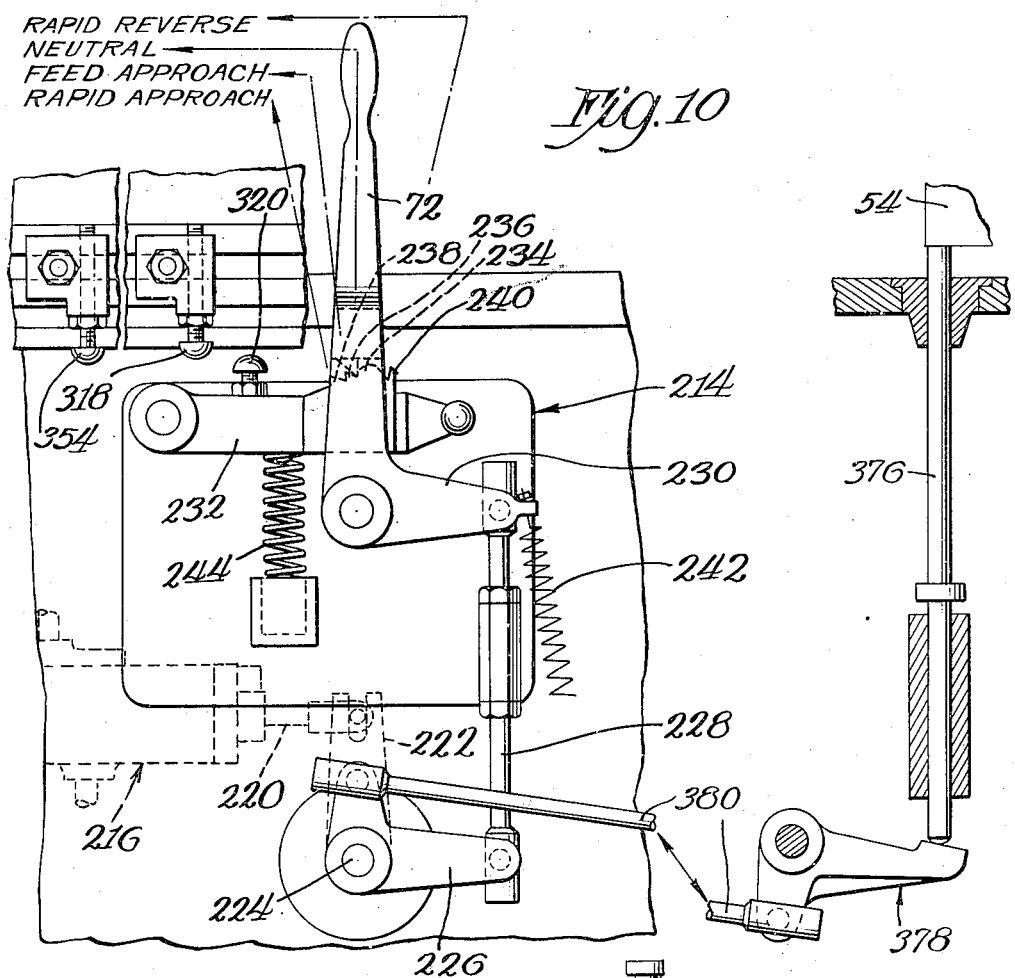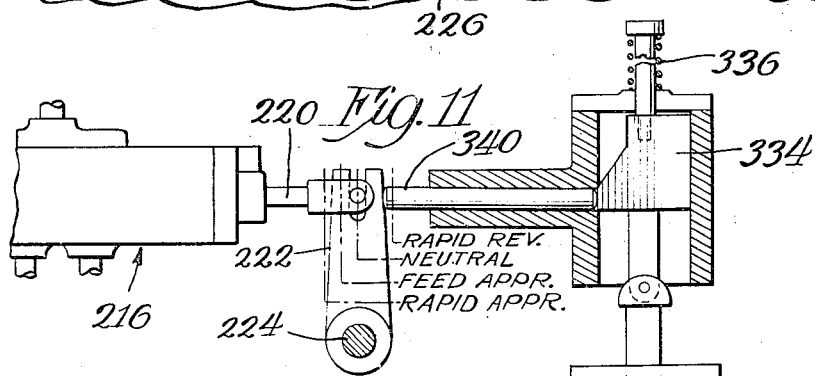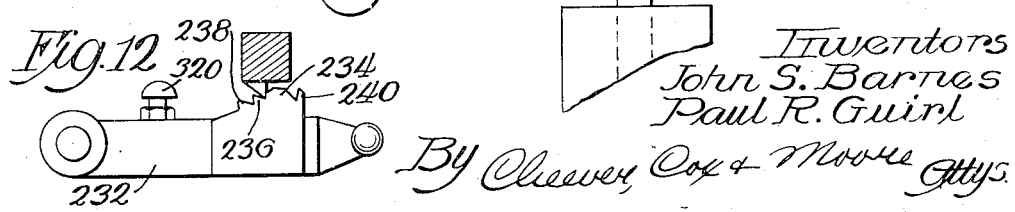

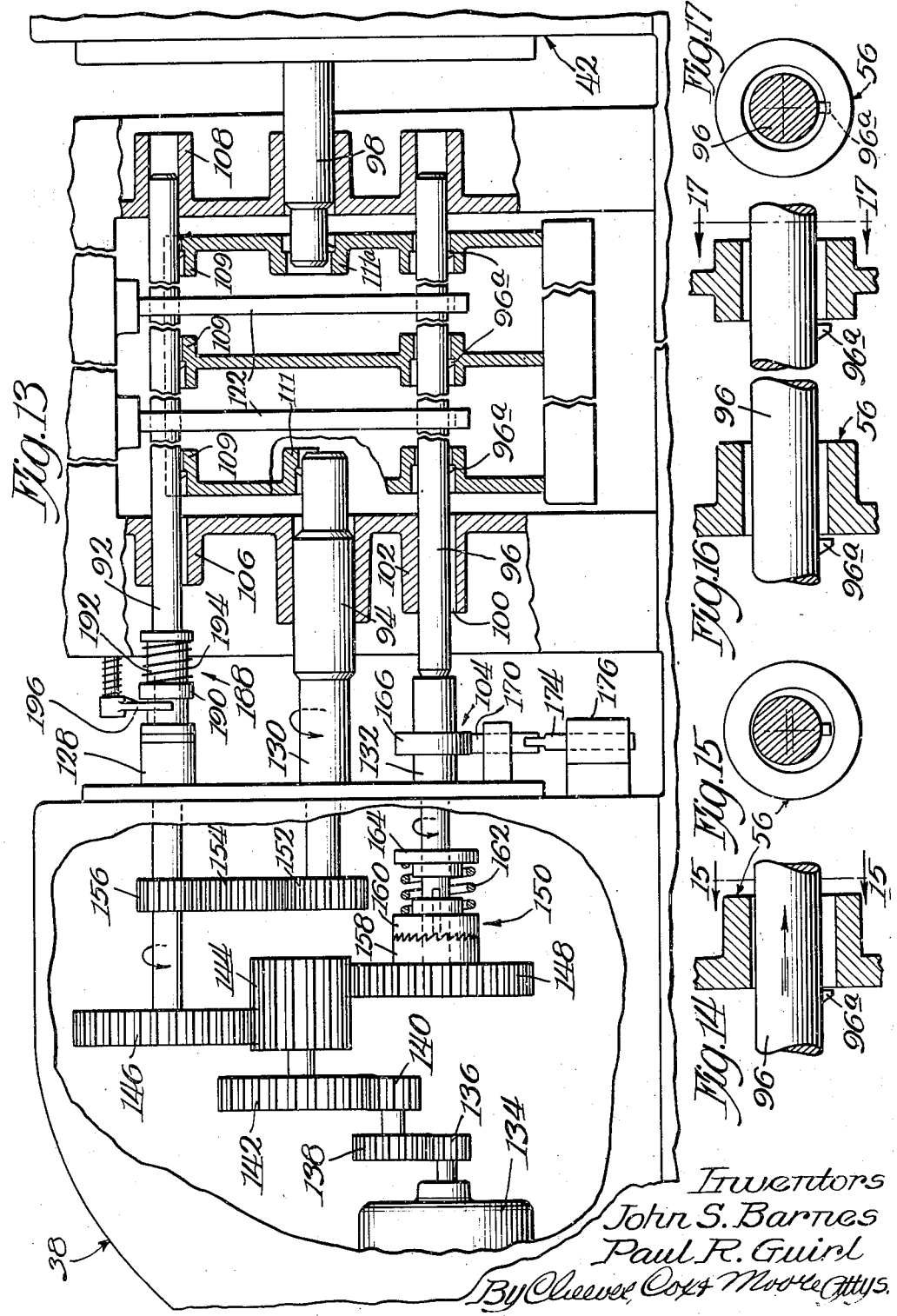

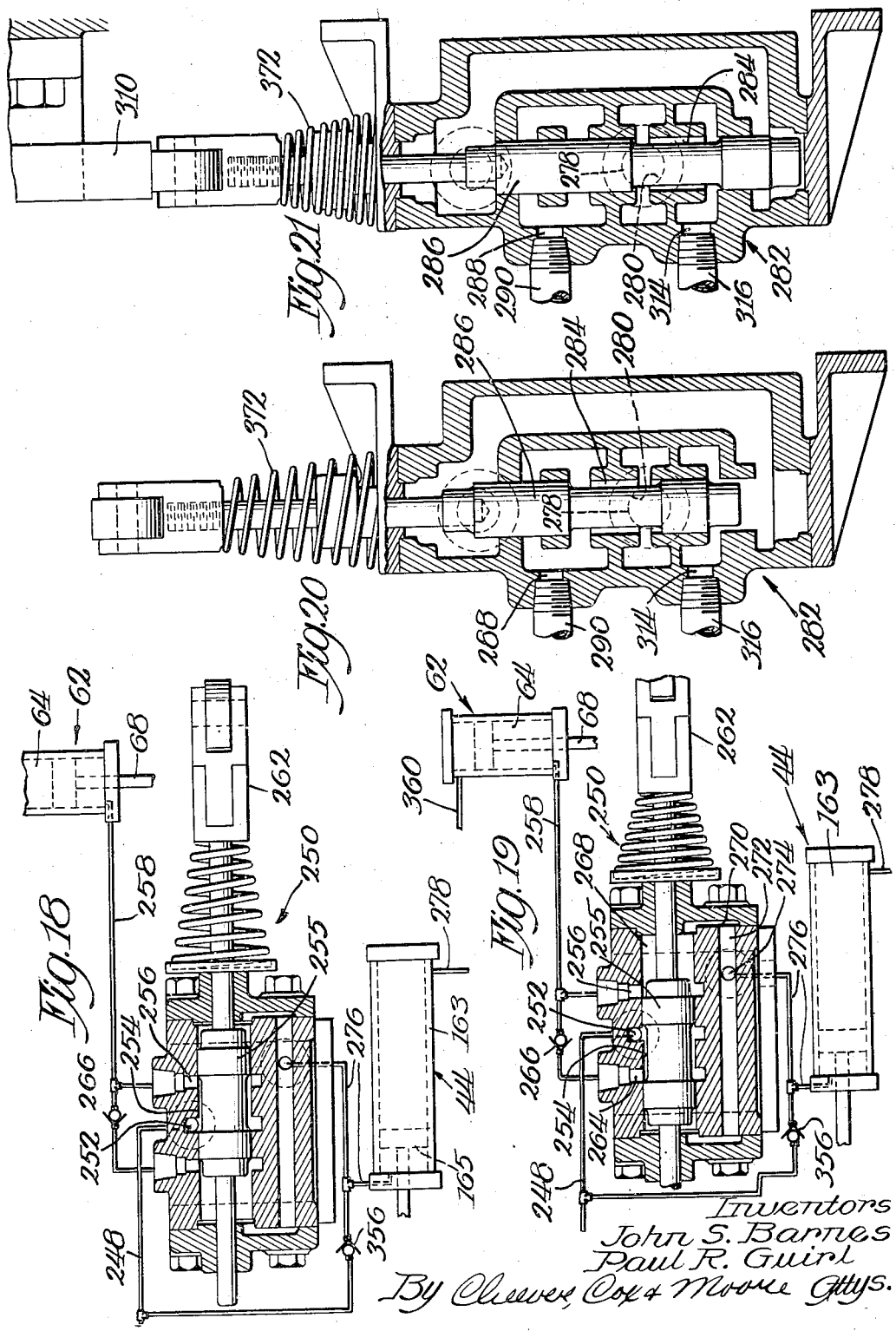

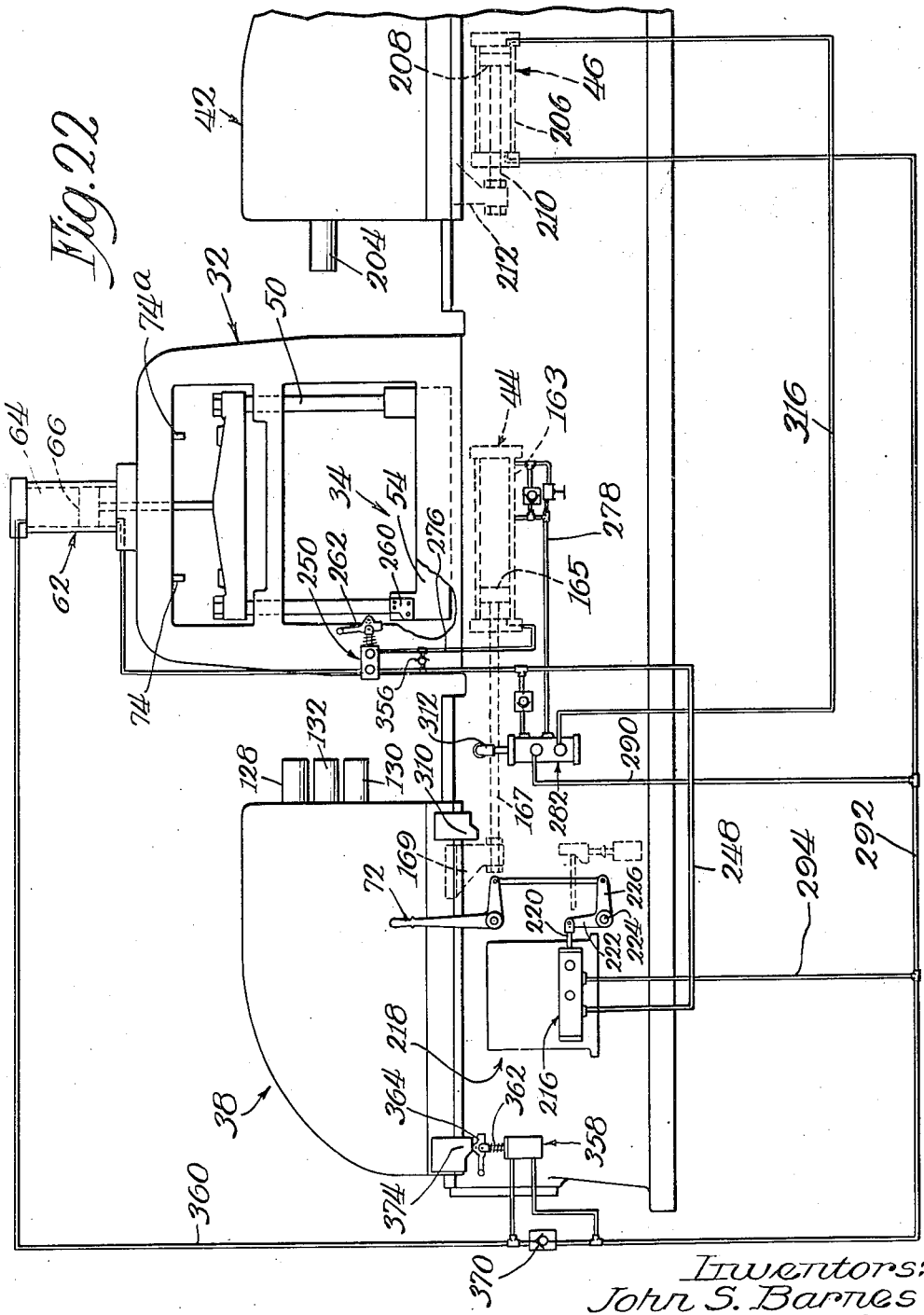

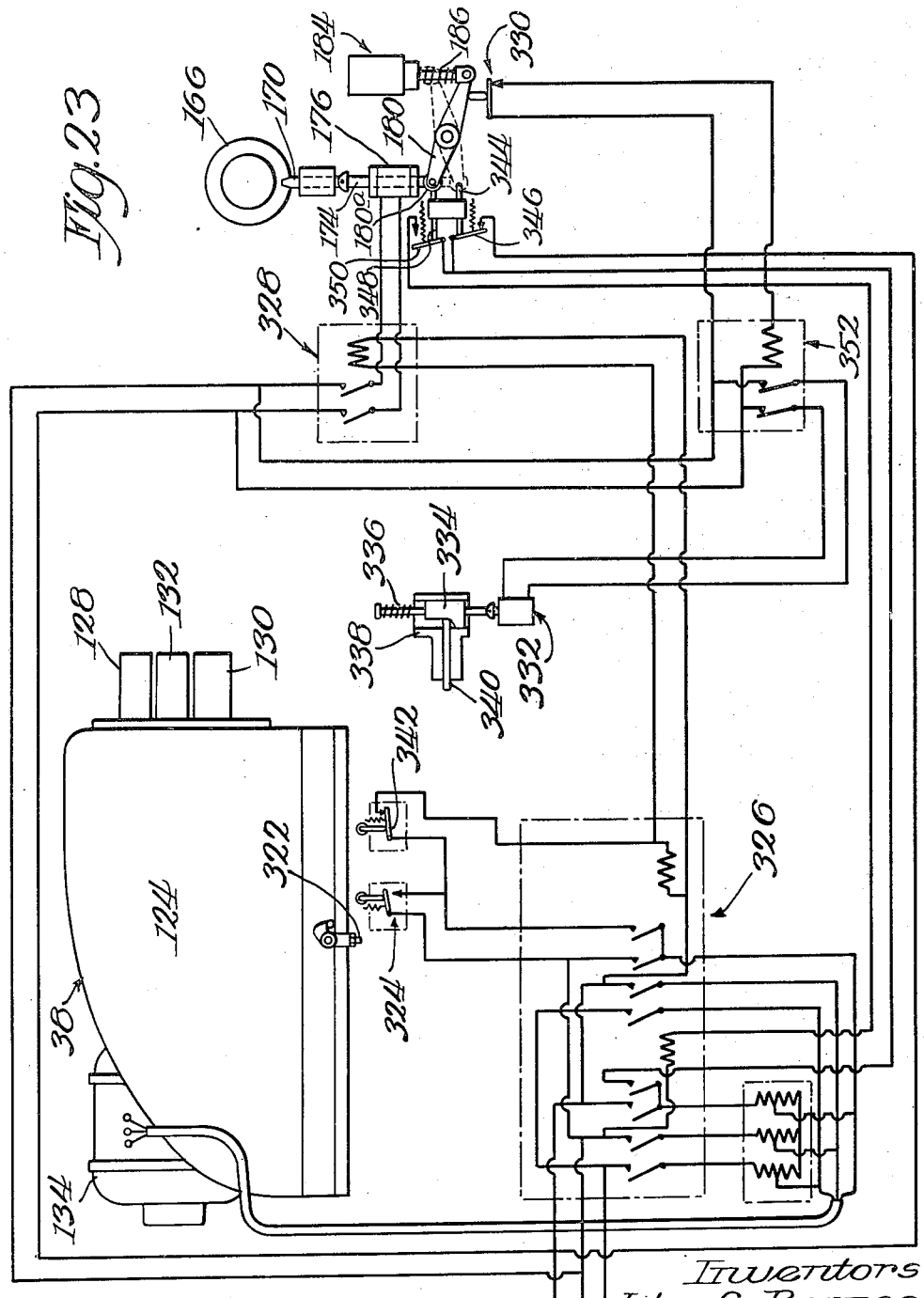

2,042,379

UNITED STATES PATENT OFFICE 2,042,379

METALWORKING APPARATUS

John S. Barnes and Paul R. Guirl, Rockford, Ill., assignors to W. F. & John Barnes Company, Rockford, Ill., a corporation of Illinois Application February 14, 1931, Serial No. 515,779

44 Claims. (Cl. 77—3)

This invention relates generally to metal working apparatus, and particularly to automatically and hydraulically controlled boring machines.

The present invention relates to the same general subject matter set forth in our co-pending application, Serial No. 507,872, filed January 10, 1931, namely, automatically controlled boring machines. The present invention, however, relates to metal working or boring machines having certain improved structural characteristics not shown in our above mentioned co-pending application.

One of the important factors which must be considered in connection with the production of machines, such as boring and drilling machines to be used for heavy duty work, is the amount of skill and effort which the operator must employ in controlling the actuation of the machine. As an example of one type of work piece which is adapted to be acted upon by boring tools, attention is directed to automobile crank cases. These crank cases frequently are constructed with a plurality of bearing surfaces which must be bored out. These crank cases are rather heavy, and therefore mechanical means must be provided for controlling the shifting or positioning thereof with respect to the cutting tools.

Heretofore considerable manual effort and skill on the part of a workman have been required in order to perform the cutting or boring operations on work pieces, such as crank case castings and the like, and it is one of the primary objects of our present invention to provide an improved practical machine, whereby manual operations on the part of a workman, as well as the skill and training which are required of him, may be reduced to a minimum.

A further object of this invention is to provide a metal working machine, such as a boring machine, in which a work piece may be automatically shifted into position to be acted upon by boring tools driven by a suitable spindle or boring head.

Another object is to provide a machine, as above set forth, in which a plurality of boring heads may be automatically advanced toward and moved away from a supported work piece, such as a crank case casting or other work piece having surfaces to be acted upon by boring tools.

Still another object of the present invention is to provide a boring or drilling machine as above set forth, which is equipped with improved systems of hydraulic and electrical control, said systems serving to render the machine fully automatic when so desired, and being further arranged to enable the manual control of the machine in a very simple and convenient manner.

More specifically, our invention contemplates the provision of a material working apparatus, such as a boring machine set forth above, in which a reciprocable spindle or boring head is employed for driving a plurality of cutting tools, and a work supporting device is provided which is adapted to be shifted into one position to permit the convenient insertion of the tools within the apertures of a work piece, and in another shifted position adapted to locate the work piece in position to be acted upon by the boring tools.

In addition to the above mentioned advantageous structural characteristics, our invention contemplates the provision of control means in combination with a plurality of reciprocable spindle or boring heads, which will automatically control the rapid traverse and slower feeding movements of said heads at proper predetermined intervals, said control means including an improved electrical circuit arrangement, whereby the rotation of the spindles will be controlled in timed relation with the cycle of reciprocation of the boring heads.

Another object of the present invention is to provide, in combination with a material working machine of the type set forth above having rotary work driving spindles, means for positively indexing at least one of said spindles to a predetermined position so as to enable the clearance of a cutting tool of the boring bar driven by said spindle as said tool is inserted within the work piece, and we further propose to control the operation of this indexing mechanism in timed relation with the cycle of reciprocation of the boring head.

A further object is to provide a boring machine having a plurality of self-contained reciprocable boring or spindle heads, each of said heads having one or more tool driving spindles and a suitable prime mover, such as an electric motor, and it is our object to provide, in combination with said heads, suitable actuating means such as a hydraulic actuator and control means therefor to automatically regulate the reciprocable movements of said heads.

The foregoing and numerous other objects and advantages will be more apparent from the following detailed description when considered in connection with the accompanying drawings, wherein—

Figure 1 is a front elevational view of a material working apparatus or boring machine, which is representative of one embodiment of our invention, the boring or spindle heads of said machine being disclosed in their starting position;

Figure 2 is a fragmentary enlarged detailed view of the valve and its associated cam mechanism for controlling the reversal of fluid flow into the hydraulic actuator for vertically shifting the work holder;

Figure 3 is a plan view of the machine shown in Figure 1;

Figure 4 is an enlarged detail sectional view of the mechanism for controlling the upward shifting of the work positioning pins, said view being taken substantially along the line 4—4 of Figure 3;

Figure 5 is a vertical sectional view taken substantially along the line 5—5 of Figure 4;

Figure 6 is an enlarged vertical sectional view of the mechanism for controlling the shifting of another of said work positioning pins, said view being taken substantially along the line 6—6 of Figure 3;

Figure 7 is an enlarged fragmentary rear elevational view of our improved boring machine taken substantially along the line 7—7 of Figure 3, said view serving to more clearly disclose the control mechanism positioned to the rear and below the left boring head;

Figure 8 is an enlarged transverse vertical sectional view of the boring machine taken substantially along the line 8—8 of Figure 1;

Figure 9 is also an enlarged transverse vertical sectional view taken substantially along the line 9—9 of Figure 1, showing the work piece clamped in position in readiness to be acted upon by the boring tools;

Figure 10 is an enlarged fragmentary front elevational view of the mechanism for controlling the shifting of the main control valve;

Figure 11 is an enlarged detail view, shown partly in section, of the mechanism for periodically preventing the reversal of the main control valve;

Figure 12 is a front elevational view of the notched lever arm shown in Figure 10, the main control lever being removed in order to more clearly disclose parts otherwise hidden;

Figure 13 is an enlarged fragmentary and semi-diagrammatic front view of the boring heads shown in operative association with a sectioned work piece, the distance between the centers of the tool driving spindles being exaggerated and so arranged as to more clearly understand the functioning of the boring tools, and the gear train within the left boring head being diagrammatically indicated so as to illustrate one embodiment of the invention;

Figure 14 is an enlarged detail sectional view of one of the boring bars of Figure 13, disclosing the work piece in its lowered position for the purpose of effecting the clearance of the tool bit of the boring bar as it enters the work piece;

Figure 15 is a transverse sectional view taken substantially along the line 15—15 of Figure 14;

Figure 16 discloses the work piece of Figure 14 after it has been elevated to the position in which the tool bit of the boring bar acts upon the work piece when rotation and longitudinal movement to the right are imparted to the boring bar;

Figure 17 is a transverse sectional view taken substantially along the line 17—17 of Figure 16;

Figure 18 is a detail sectional view of the valve for controlling the delivery of fluid to one end of the actuator for the left boring head, said view being taken substantially along the line 18—18 of Figure 1, a portion of the hydraulic circuit connected therewith being shown diagrammatically for the purpose of more clearly disclosing the functioning of said valve;

Figure 19 is a sectional view similar to Figure 18, disclosing the position occupied by the valve when the work support has been elevated so as to clamp the work piece in position in readiness to be acted upon by the boring tools;

Figure 20 is an enlarged vertical sectional view of the valve for controlling the delivery of fluid to the hydraulic actuator connected with the right boring head, said view being taken substantially along the line 20—20 of Figure 7, the valve, however, being shown in the position which it occupies prior to the engagement therewith by the cam carried on the rear side of the left boring head;

Figure 21 is a view similar to Figure 20, disclosing the position occupied by the valve when the cam of the left boring head occupies the position shown in Figure 7;

Figure 22 is a diagrammatic representation of the hydraulic system of control shown in association with the machine elements; and Figure 23 discloses the electrical circuit employed to control the functioning of the left boring head, etc.

Referring now to the drawings more in detail wherein like numerals have been employed to designate similar parts throughout the various figures, it will be seen that for the purpose of illustrating one practical embodiment of the invention, and not by way of limitation, we have disclosed a material working machine of the type commonly referred to as a boring or drilling machine. This machine includes a central bed or base 30, and mounted upon and extending upwardly from this base is a frame 32. This frame 32 forms the mounting for a vertically shiftable work support designated generally by the numeral 34, Figures 1, 7, and 9. A bed 36 positioned to the left of the central bed 30, Figure 1, provides a support for a reciprocable boring or spindle head 38, while a second bed 40 positioned at the right of the central bed 30 provides a support for a reciprocable boring head 42. These boring heads 38 and 42 are adapted to be reciprocated upon their respective beds through the agency of companion hydraulic actuators 44 and 46 respectively, Figure 1.

Work support

The work support 34 includes a horizontally disposed cross-head 48, Figures 1, 7, and 9. Opposite extremities of this cross-head 48 are connected with the upper ends of guide bars or shafts 50 by means of nuts 52. The lower ends of these guide bars carry a work supporting table or platen 54, and it will be seen in Figure 9 that this table 54 is adapted to be moved upwardly so as to clamp a work piece or casting 56 against positioning blocks 58, which are secured in a fixed position to the underside of an intermediate section 60 of the frame 32.

Movement is imparted to the work supporting means 34 through the agency of a hydraulic actuator indicated generally by the numeral 62, Figures 1, 3, and 22. This actuator includes a cylinder 64, a piston head 66 reciprocable within said cylinder head, and a piston rod 68 which serves to connect said head with the central portion of the cross-head 48. The hydraulic circuit for controlling the functioning of this hydraulic actuator 62 will be more apparent as the description progresses.

Stop mechanism for work support

Assume that the work supporting means 34 occupies its lowermost position as shown in Figure 1. In this position the upper surface of the platen 54 is substantially co-planar with the adjacent upper surface 70, Figures 1 and 9, of the lower portion of the frame 32. The work piece 56, which in the present disclosure represents a crank case and cylinder block casting, is laterally moved into position upon the platen and located thereon by any suitable means. After the work has been thus positioned, the operator urges a main control handle 72 to its extreme left position, and this causes a hydraulic circuit, later to be described, to be conditioned so as to impart an upward movement to the actuator piston 66. The work piece 56 is elevated until the cross-head 48 is moved into engagement with the lower extremities of positioning pins 74 and 74a, Figure 9. These pins are identical in structural and functional characteristics, and are provided at their upper ends with tapered heads 76 and 76a, Figures 4 to 6 inclusive. Mounted above the pin 74 are a pair of rollers 78, which are supported in a block 80. This block is adapted to be shifted at right angles to the axis of the pin 74 through the agency of a suitable shifter bar 82. The outer end of this bar 82 is provided with rack teeth 84 which mesh with a pinion 86 supported by a cross-shaft 88. The pin 74a co-operates with similar rollers 78a, which are mounted within a block 80a connected with a shifted bar 82a. This shifter bar 82a is also adapted to be moved in response to the rotation of the shaft 88 carrying a pinion 86a which meshes with rack teeth 84a. The bar 82a is continuously urged to the left through the agency of a coiled spring 90, Figure 6.

When the cross-head 48 is initially moved upwardly, as described, said head is moved into engagement with the pins 74 and 74a, and at this moment the rollers 78 and 78a are positioned as shown in Figures 4 and 5. In this position the pins 74 and 74a centrally engage the periphery of the lowermost roller of each pair. At a later interval the rollers, through the agency of the rack and pinion construction, are shifted to the right, thereby permitting the pins 74 and 74a to be moved upwardly a short distance to the position shown in Figure 6. This slight shifting of the work supporting platen serves to finally locate the work piece in position to be acted upon by a plurality of boring bars 92, 94, 96, and 98.

The purpose of shifting the work piece to its final position, as set forth above, will be more apparent when reference is made to Figures 13 to 17 inclusive. Figure 14 is an enlarged view of the boring bar 96, which bar includes radially disposed boring cutters 96a. When the boring bar 96 is moved into association with the work piece, it is essential that the bar be secured against rotation, and that the cutters 96a extend downwardly into a predetermined position as shown in Figures 14 and 15, in order that said cutters will register with a slot 100 provided in a bushing 102, Figure 13. This is automatically accomplished through the agency of an index mechanism 104, later to be described. It is also essential that the work piece occupy the lowered position shown in Figures 14 and 15 in order that certain of said cutters will clear the bearings of the work piece or casting 56 as the boring bar 96 is being urged to the right, Figure 13. When the cutters 96a are carried by the boring bar to the position shown in Figure 16, they are in readiness to perform a cutting operation upon the bearings of the work piece. At this instant the shifter bars 82 and 82a are automatically or manually moved to the right, Figures 4 to 6 inclusive, thereby shifting the rollers 78 and 78a away from the upper extremity of the pins 74 and 74a respectively. This permits the required upward shifting of the work piece so as to locate said work piece in the position shown in Figures 16 and 17.

In this connection it will be noted that the boring bar 92 is of the type which is adapted to remain in position within its bushings 106 and 108, Figure 13, because it is employed to cut the semi-cylindrical surface or bearing 109 positioned at the upper portion of the work piece, Figure 9. The boring bar 94 is employed to remove stock from a bearing surface 111 positioned at one end of the casting and hence need not be urged completely through the work piece in the manner described in connection with the boring bar 96. The boring bar 98 which is driven from the right boring head 42 is also employed to remove stock from an end bearing 111a of the work piece. When the boring operations have been completed and the boring bars 94, 96, and 98 have been withdrawn from the work piece, the work support 34 may again be lowered to the position shown in Figure 1 and the work piece 56 removed, and a new work piece positioned in its place. As the cross-head 48 of the work support 34 moves away from the pins 74 and 74a, the coiled spring 90, which acts against a collar 112 on the rod 82a, causes said rod, together with the rod 82, to be shifted to the left, thereby repositioning the rollers 78 and 78a, (see Figures 4 to 6 inclusive). The rotation of the shaft 88 may be manually controlled through the agency of a control handle 114, Figure 1, which is pivotally mounted on the front side of the frame 32. Extending laterally of this handle 114 is an arm 116, which is connected by means of a link 118 with the outer end of an arm 120 carried by the shaft 88. The automatic actuation of this shaft 88 will be more apparent as the description progresses. At this point attention is directed to a plurality of brackets 122 which are secured to and depend from the intermediate frame section 60, Figures 1 and 13. These brackets serve as supports for the boring bar 96.

Left boring head

Having now set forth in a general way the means which we employ for receiving, elevating, and finally positioning the work piece 56 so as to be acted upon by the boring bars, we shall proceed to describe the means, namely, the left boring head which serves to control the reciprocation and rotation of the boring bars 92, 94, and 96. This head 38 is of a self-contained construction and includes a suitable housing or casing 124 which is reciprocable on ways 126 provided along the upper portion of the bed 36, Figures 1 and 8. This head 38 also includes a plurality of rotary work driving spindles 128, 130, and 132, which are adapted to respectively drive the boring bars 92, 94, and 96. In Figure 13 we have in a diagrammatic way indicated a gear train which may be employed to impart rotation to these spindles from a prime mover or electric motor 134. Thus the motor drives a gear or pinion 136 which meshes with a gear 138. Meshing gears 140 and 142 driven from the gear 138 serve to drive a gear 144, which meshes with gears 146 and 148. The gear 146 drives the spindle 128, while the gear 148 through a suitable clutch mechanism 150 drives the spindle 132. The spindle 130 is geared to the spindle 128 through the agency of gears 152, 154, and 156. Thus the prime mover or motor 134 serves as the driving means for the spindles 128, 130, and 132.

The clutch mechanism 150, Figure 13, includes a pair of companion clutch members 158 and 160. The member 158 is rotatable with the gear 148, while the member 160 is keyed to the spindle 132 and is movable longitudinally of said spindle. A coiled spring 162, which is interposed between the clutch member 160 and a collar 164, serves to continuously urge said clutch member toward its companion member 158. When the motor 134 is rotated in a driving direction, that is, in a direction to impart righthand rotation to the spindles 128, 130, and 132, as indicated by the directional arrows in Figures 13, the clutch member 158 meshes with and positively drives the clutch member 160. This righthand rotation is employed during the cutting action of the boring bars. When reverse rotation is imparted to the spindle of the motor 134, as will later be described, the clutch member 158 will click past the companion member 160 without imparting rotation to the spindle 132 or its associated boring bar 96, if said spindle is secured against rotation by the mechanism 104. As the boring head 38 is shifted to the left, no rotation is experienced by the boring bar 96, and said bar will be automatically positioned so as to bring the tool cutters 96a into registration with the slot 100 of the bearing 102, Figure 13, through the agency of the indexing or positioning mechanism 104.

Reciprocation is imparted to the head 38 through the agency of the hydraulic actuator 44, Figures 1, 9, and 22. This actuator includes a cylinder 163, a piston 165 which is reciprocable within the cylinder, and a piston rod 167 which serves as a connection between the piston and a bracket 169 which is secured to and depends from the head 38.

*Spindle indexing or positioning mechanism*

The mechanism 104, Figures 8 and 13, includes a collar 166 which is keyed to the spindle 132. This collar is provided with a notch 168 which is adapted to receive the upper end of a vertically shiftable latch member 170. This latch member is reciprocable within a bracket 172 and is connected at its lower end to the upper extremity of a plunger 174 which forms a part of a solenoid 176. The lower end of the plunger of the solenoid engages a roller 178 mounted at one end of a rocker arm 180. This rocker arm 180 makes a slotted connection at its opposite extremity with the lower end of a rod 182, which forms an element of a dash-pot 184. A coiled spring 186 continuously urges the rod 182 downwardly, and when the latch member 170 becomes lodged within the notch 168, the rocker arm assumes the position shown by full lines, Fig. 8, and the spring 186 serves to maintain the arm in this position. The energizing of the solenoid 176 causes the plunger 174, together with the latch member 170, to be urged downwardly, thereby disengaging said latch member from the notch 168.

As the spindle head 38 is initially advanced so as to carry the boring bars toward the work piece, the latch member 170 is lodged within the notch 168 so as to insure the registration of the cutters 96a of the boring bar 96 with the slot 100 of the bearing 102, Fig. 13. When the cutters 96a reach the position shown in Figure 16 and the work piece has been elevated to its final position as described above, an electrical circuit, later to be described, functions to energize the solenoid 176, thereby automatically releasing the spindle 132. At this instant the prime mover or motor 134 is energized so as to impart rotation to the spindle 132 in the direction indicated by the arrow in Figure 13. Upon the completion of the cutting stroke of the boring bar 96, the index mechanism 104 again functions so as to position the cutters of the boring bar 96 for registration with the slot 100 as the bar is moved to the left out of the work piece. The automatic functioning of the indexing mechanism 104 will be more clear from the description of the electrical control which is to follow.

*Automatic pick-up chuck*

Attention is directed to the fact that we propose to employ a chuck mechanism designated generally by the numeral 188, Figure 13. A detailed description of this mechanism is not necessary for a clear understanding of the present invention, and in this connection reference is again made to our above mentioned co-pending application, wherein a clutch mechanism having functional characteristics simulating the chuck mechanism 188, is described in detail. It will suffice to say that the chuck mechanism 188 includes a shiftable collar 190 which is longitudinally shiftable upon a sleeve 192, and a coiled spring 194 constantly urges said collar to the left. The mechanism 188 is coupled with the boring bar 92, and a depending arm 196 serves to engage the collar 190 as the boring head moves to the left to automatically effect the disengagement of the spindle 128 from the bar 92. When the spindle 128 is moved into association with the mechanism 188, said spindle is automatically coupled with the bar 92.

*Right boring head*

The right boring head 42 is a self-contained structure similar to the boring head 38, in that it includes a housing or casing 198 and a prime mover or motor 200 mounted within said casing. The head 42 is reciprocable upon suitable ways 202 provided along the upper portion of the bed or base 40, Figures 1 and 3. In the present embodiment we have disclosed a single work driving spindle 204 which is driven from the motor 200. This spindle 204 supports the boring bar 98 which is adapted to remove stock from the bearing section 111 positioned at the right end of the work piece, as clearly shown in Figure 13. Reciprocation is imparted to the head 42 by means of the hydraulic actuator 46, which includes a suitable cylinder 206, a piston head 208, and a piston rod 210, which serves to connect the head with a bracket 212 secured to and depending from the head 42, Figures 1 and 22. The actuator 46 is suitably mounted within the bed 40 and fluid is supplied thereto from a hydraulic circuit, to be described.

*Hydraulic control mechanism*

Before describing in detail the functional characteristics of the hydraulic and electrical circuits employed to control and correlate the movements of the various machine elements, attention is directed to the control device in Figures 10 to 12 inclusive and Figure 22, which we have designated generally by the numeral 214. This mechanism includes the control handle 72 which, when shifted, operates a main control valve 216. This valve 216, together with a pumping mechanism designated generally by the numeral 218, is of conventional design and is commonly known in the trade as "Oilgear" equipment. In view of the fact that the valve and its associated pumping mechanism 218 are of well known design, a detailed description and disclosure thereof are not essential to a clear understanding of the present invention. It will suffice to say that the valve 216 is of the well known type which may be shifted to at least five positions. The shifting of this valve serves to not only control the direction of flow of fluid, but also to control the degree of displacement. In varying the displacement of the fluid, the speed of travel of the hydraulic actuators 44 and 46 are correspondingly varied. The various shifted positions of the valve 216 which are employed in the present invention, are clearly designated in Figures 10 and 11.

When the main control handle 72 occupies the vertical position shown in Figures 1 and 10, the valve 216 occupies its neutral position. The valve 216 is connected with the handle 72 through the agency of a valve stem 220, an arm 222 carried by a transversely extending shaft 224, a bell-crank 226 also carried by the shaft 224, and an extensible rod 228 which is interposed between the bell-crank 226 and an arm 230 extending laterally of the control handle 72. The control handle 72 is secured in its various positions by means of a pivoted lever 232, which is provided with a plurality of stops 234, 236, 238, and 240. The arm 72 is continuously urged in a clockwise direction, as viewed in Figure 10, by means of a spring 242, and the lever 232 is continuously urged upwardly by means of a spring 244. The manual control of the valve 216 may be occasioned by simply depressing the lever 232 so as to release the handle 72 from the stops, and thereby permit free manual manipulation of said handle. The automatic control of the handle 72 will be explained in connection with the hydraulic and electrical circuits, about to be described.

*Hydraulic and electrical control circuits and statement of operation*

Assume that the work piece 56 has been mounted upon the platen 54 in the manner described above and that said platen occupies its lowermost position, as clearly shown in Figure 1. Assume also that the motor 246, Figure 3, which serves to drive the pumping mechanism 218, is operating and that the motor 200, which serves to rotate the spindle 204, is also operating. The heads 34 and 42 are now located in their starting positions, as shown in Figure 1, and the control handle 72 occupies its vertical neutral position. In this position fluid from the pumping mechanism 218 circulates through the valve 216 without imparting movement to any of the hydraulic actuators.

The handle 72 is now urged to the left, Figure 10, so as to position said handle against the stop 238. In this position the valve 216 is conditioned for rapid displacement of fluid through a pipe line 248, Figures 18 and 22. This pipe line 248 communicates with a valve 250. This valve 250 now occupies the position shown in Figure 18. In this position fluid from the pipe line 248 passes through a valve port 252, an annular valve passage 254, in a valve member 255 and thence outwardly through a port 256 into a pipe line 258, which connects with the lower end of the actuator cylinder 64. This causes the upward movement of the platen 54. The platen 54 carries a cam 260 and as the work supporting means 34 is moved into engagement with the lower ends of the positioning pins 74 and 74a, said cam urges a lever 262 to the left. This lever is connected to the valve member 255, Figure 18, and is pivoted at its upper end to the front side of the frame 32. The cam 260 shifts the valve member 255 to the position shown in Figure 19, and in this position fluid from the pipe line 248 is conducted from the port 252 and the annular valve passage 254 through a valve port 264, which connects with the pipe line 258 through a check valve 266. Fluid also passes into an end chamber 268 of the valve through the port 256, and from this chamber is conducted by valve passages 270 and 272 through a port 274, which connects with the left end of the hydraulic actuator cylinder 163 through a pipe line 276. This causes the head 38 to be advanced at a rapid rate toward the work piece, and fluid from the right end of the actuator cylinder 163 is conducted through a pipe line 278 into a port 280 of a valve designated generally by the numeral 282, Figures 20 to 22 inclusive. At this instant this valve 282 is positioned as shown in Figure 20. Fluid from the port 280 is conducted through an annular passage 284 provided in a valve member 286 to a port 288, which communicates with a pipe line 290. This pipe line 290 is connected with the return port of the main valve 216 through a pipe line 292 and a pipe line 294, Figure 22.

As the head 38 continues its rapid advancing movement, the forward end of a horizontal rod 296, Figures 7 and 9, which is carried on the rear side of the head casing 124, is moved into engagement with a roller 298 carried by a bellcrank arm 300. This engagement takes place after the cutters 96a of the bar 96 have been advanced through the slot 100, Figure 13, and are in position for cutting action upon the work piece. The arm 300 is mounted upon a shaft 302 and is formed with a companion bellcrank arm 304. This arm 304 is pivotally connected at its outer end through the agency of a link 306 with an arm 308, which is supported at the rear extremity of the shaft 88. The engagement of the rod 296 with the roller of the bellcrank arm 300 causes the shaft 88 to experience a slight rotation in a counterclockwise direction as viewed in Figure 7, and a clockwise direction as viewed in Figures 4 and 6. This causes the rods 82 and 82a to be shifted so as to permit their companion positioning pins 74 and 74a to be shifted upwardly in response to the hydraulic force acting upon the work supporting carriage or means 34. As described above, this shifting action positions the work piece 56, as shown in Figures 16 and 17, in readiness to be acted upon by the boring bars.

Slightly before or contemporaneously with the final positioning of the work piece, a cam member 310 supported on the front side of said head, Figures 21 and 22, engages a roller carried at the upper end of a valve stem 312 of the valve member 286. The downward shifting of this valve member 286 conditions the valve 282, as shown in Figure 21. Fluid from the advancing end of the hydraulic actuator 44 which passes through the pipe line 278, is now directed by the annular passage 284 to a valve port 314 which connects with a pipe line 316. This pipe line connects with the right end of the cylinder 206 of the hydraulic actuator 46. With the valve 282 conditioned as described, rapid approach movement is imparted to both of the heads 38 and 42. Fluid from the advancing end of the actuator 46 is conducted through the pipe line 292 and the pipe line 294 to the main control valve 216, Figure 22.

Immediately subsequent to the actuation of the valve 282, and simultaneously with the final positioning of the work piece, a dog 318, adjustably carried on the front side of the head 38, engages an abutment 320 on the pivoted arm or lever 232, Figures 1 and 10. This causes the automatic shifting of the control handle 72 from its rapid approach position to the feed approach position as indicated in Figure 10. This conditions the main valve 216 for the displacement of high pressure fluid through the pipe line 248 and causes the heads 38 and 42 to be advanced at a feeding rate into the work piece 56. During the feeding movement of the heads 38 and 42, the valve 282 remains in the position above described with respect to the rapid approach movement of the heads. That is, the valve causes the fluid exhaust from the hydraulic actuator 44 for the head 38 to be passed through the hydraulic actuator 46 for the head 42. The actuators are thus in series relation in the hydraulic circuit. This insures that positive proportional movement will be imparted to both heads regardless of variations in the frictional resistance which the heads may individually encounter.

Contemporaneously with the automatic shifting of the control handle 72, a dog 322, Figure 23, carried by the head 38 closes a normally open switch 324. The closing of this switch conditions a magnetic switch, indicated generally by the numeral 326, to close the electrical circuit including the motor 134 so as to cause rotation of the spindles 128, 132, and 130 in a counter-clockwise direction, as viewed from the right end of Figures 22 and 23 and as indicated by the directional arrows in Figure. 13. Closing the switch 324 also energizes a magnetic switch 328, Figure 23, which closes the electrical circuit including the solenoid 176. This causes the immediate dislodgment of the latch member 170 from the companion notch within the collar 166, Figures 8 and 23. Thus the spindle 130, which is continuously coupled with the boring bar 96, is rotated in a cutting direction at the instant that the cutters 96a approach the work piece in readiness to make a cut.

The disengagement of the latch 170 causes the counter-clockwise swinging of the rocker arm 180, thereby positioning said arm, as shown by the dotted lines in Figures 8 and 23. This causes a normally open switch 330 to open, and this results in demagnetizing a solenoid 332. The plunger of this solenoid 332 is connected with a cam 334, and a coiled spring 336 positioned at the upper end of the cam and acting against a cam support 338 causes said cam to be urged upwardly, thereby shifting a rod 340 to the left, Figures 11 and 23. This rod 340 is positioned in the path of the arm 222 which operates the main control valve 216, and thus prevents said control valve from being shifted to a reverse position during the rotation of the spindles as said spindles are making a cut within the work piece. This is a very important feature inasmuch as the boring bar 96 can only be withdrawn from the work piece when the cutters 96a of said bar are positioned in registration with the slot 100, this position being automatically insured through the agency of the mechanism 104, Figures 8 and 13.

The boring tools continue to advance at a feeding rate until the dog 322 depresses and thereby opens a normally closed switch 342, Figure 23. The opening of this switch conditions the magnetic switch 326 so as to deprive the motor 134 of electrical energy and the magnetic switch 328 is deenergized, thereby effecting the deenergizing of the solenoid 176, Figure 23. Thus the motor 134 is deprived of power and the latch member 170 is now urged upwardly in response to the action of the coiled spring 186, Figure 8. In other words, this coiled spring 186 urges the lever 180 in a clockwise direction from the dotted position shown in Figures 8 and 23. The dash-pot 184 in this instance serves to retard the movement of the rock arm 180, and as the roller 180a moves away from a plunger 344, a switch 346 closes, and this causes the motor 134 through the magnetic switch 326 to be rotated in a reverse direction, that is, rotation in a direction which causes the spindles 128, 130, and 132 to rotate in a clockwise direction, as viewed in Figure 8. During this reverse rotation of the motor the clutch members 158 and 160, Figure 13, serve to operatively connect said motor with the spindle 132 until the latch member 170 automatically moves into the companion notch 168. At this instant the clutch member 158 will click past the companion member 160 in the event that continued rotation of the motor in the reverse direction takes place. The instant that the latch member 170 interlocks within the notch 168, the roller 180a engages a plunger 348, thereby opening a switch 350. The opening of this switch functions through the magnetic switch 326 to stop rotation of the motor 134. At this point it should also be noted that as the rocker arm 180 reaches the limit of its clockwise movement so as to urge the latch member 170 into locking engagement with the notch 168, the opposite end of said lever causes the normally open switch 330 to be closed. The closing of this switch causes a magnetic switch 352, Figure 23, to operate, thereby affecting the energizing of the solenoid 332. This causes the downward shifting of the cam member 334 against the action of the spring 336 and moves said cam member from the position shown in Figure 11 to the position shown in Figure 23. The shifting of the cam member to its downward position permits the main control valve 216 to be shifted to its reverse position. Thus, it will be apparent that the rocker arm 180 cooperates with the latch member 170 so as to prevent the rearward shifting of the boring heads 38 and 42 until said latch member has been moved into registration with the notch 168. When the latch member and notch interlock, the cutters 96a of the boring bar 96 are in registration with the slot 100, Figure 13, of the bearing 102.

During the same interval of operation just described a dog 354 adjustably mounted upon the front side of the boring head 38, Figures 1 and 10, engages the abutment 320 of the control mechanism, thereby releasing the control handle 72 to permit said handle to be shifted to the rapid reverse position designated in Figure 10, in which position said handle bears against the stop 240. As stated above, this reversal cannot take place until the cam member 334 has been shifted downwardly from the position shown in Figure 11. The shifting of the handle 72 to its rapid reverse position causes fluid from the main control valve 216 to be directed in a reverse direction, namely, from said valve through the pipe line 294, the pipe line 292, and into the cylinder of the hydraulic actuator 46, Figure 22. Fluid from the opposite end of this cylinder passes through the pipe line 316 into the valve 282, which is now positioned as shown in Figure 21. Fluid from the valve 282 is directed through the pipe line 278, which communicates with the right end of the hydraulic actuator 44. Fluid from the advancing or left side of the actuator piston 165 is directed through the pipe line 276, a check valve 356, and the pipe line 248, which communicates with the return side of the main control valve 216. Thus the hydraulic actuators 44 and 46 are shifted so as to effect the rapid reverse movement of the heads 38 and 42.

Attention is directed to the fact that during the rapid reversal of the heads 38 and 42, the hydraulic actuator 62 is not lowered because a valve mechanism 358, Figures 2 and 22, is closed and thereby prevents the flow of fluid through a pipe line 360, which connects with the upper end of the actuator cylinder 64. A coiled spring 362 acts upwardly against the free end of a lever 364 pivotally mounted on the front side of the base 36 so as to normally urge a valve member 366 upwardly within its casing 368. In this position said valve member closes communication between the pipe lines 292 and 360. It will also be noted that a check valve 370, which normally allows fluid to flow from the pipe line 360 into the pipe line 292, operates when the fluid flow is reversed, to prevent communication between said pipe lines.

As the boring head 38 moves to the left, the cam 310 eventually releases the valve member 286 of the valve 282, Figures 20 to 22 inclusive, thereby permitting a coiled spring 372 to automatically urge said valve member upwardly to the position shown in Figure 20. At this interval the right boring head 42 has reached its starting position, but the boring head 38 must be reversed further. The valve 282 thus functions in the position shown in Figure 20 to receive fluid from the pipe line 290 into the valve port 288, and to discharge said fluid through the valve port 280 into the pipe line 278, which communicates with the right end of the cylinder 163. As the boring head 38 approaches the limit of its reverse movement, a cam 374 carried by the head 38 depresses the lever 364, Figures 2 and 22, thereby conditioning the valve 358 so as to permit fluid to flow from the pipe line 292 into the pipe line 360, which connects with the upper end of the hydraulic actuator 62. The actuator 62 now functions to lower the work supporting means 34, and as said work supporting means approaches its lowermost position, the bottom of the platen 54, Figures 1, 7, and 9, engages the upper end of a shifter rod 376. This rod operates a bell-crank 378, which is connected by means of an extensible link 380 with the bellcrank 226. The bellcrank 226 is rotated so as to effect the shifting of the control handle 72 to its neutral position. The work piece may now be removed from the platen and another work piece substituted in its place. As soon as the second work piece is properly located upon the platen, the operator urges the control handle 72 to the left and the above described cycle of operation again takes place. It should be noted that by employing the valve 250, Figures 1, 18, 19, and 22, the piston 86 of the actuator 62 is continuously subjected to fluid pressure in an upward direction during the shifting of the boring head 38 toward and away from the work piece, and that only when said head approaches the limit of its rearward movement is fluid pressure applied in a reverse direction upon the piston 66.

Summary

From the foregoing it will be apparent that our invention contemplates the provision of an improved material working apparatus or boring machine equipped with a plurality of devices or spindle heads for driving rotary tools such as boring bars, and further contemplates the provision of a shiftable work support, which is adapted to locate a work piece in position to receive the tools advanced by the spindle heads, and which is further adapted to shift the work piece to another position to be acted upon by said tools. The reciprocation of the driving devices or spindle heads is automatically and hydraulically controlled in a very practical and convenient manner with a minimum amount of effort and skill on the part of an operator. In fact, the only time the workman is required to exert any degree of manual effort is at the time the work piece is associated with and removed from the machine. This is greatly facilitated by using auxiliary devices for handling the work piece. After the work piece has been positioned upon the platen, it is only necessary for the operator to shift the control handle 72 to its extreme left or rapid approach position. The initial upward shifting of the work support 34, the rapid approach of the spindle heads, the final positioning of the work support, the feeding approach movement of the spindle heads, the actuation of the motor of the left head, and the return rapid movements of said heads all take place in their proper sequence without any further effort on the part of the operator. A machine constructed in accordance with the teachings of our present invention is particularly adaptable for use in shops where production systems are employed, for instance, where one machine is employed to perform certain definite cutting operations on a work piece such as the boring of the bearings of a crank case and cylinder block. The above described hydraulic system of control enables the same fluid which is employed for shifting the spindle heads to be used in the hydraulic actuator which shifts the work support, and the electrical system of control cooperates with the hydraulic system in a very effective and efficient manner. The controlling of the actuation of the prime mover or motor of the left head, as for example the reversing thereof as the boring bars complete their cutting stroke, insures the functioning of the index mechanism 104, which serves to lock the boring bar 96 in a predetermined position against further rotation until said bar has been moved to a predetermined position in association with the work piece or to a predetermined position spaced from the work piece, as clearly described above.

If it is desired to manually control certain of the operations, this may be conveniently accomplished. In this connection it will be noted that the control lever 144 may be manually shifted for controlling the functioning of the stop pins 74 and 74a and by depressing the lever 232, the main control handle 72 is free to be manually shifted from one position to another. It should also be noted that the heads 38 and 42 are self-contained, namely, are each equipped with a prime mover or electric motor and individual tool driving spindles which are driven by said prime movers. These self-contained heads are shiftable as a unit toward and away from the work piece by means of simple hydraulic actuators in proper timed relation with respect to the actuator which controls the shifting of the work support.

Obviously our present invention is not limited to the specific structural features shown in the drawings, but is capable of numerous other modifications and changes without departing from the spirit and scope thereof, and said invention should only be limited by the scope of the appended claims.

Having thus described our invention, what we claim as new and desire to secure by Letters Patent is:

1. In a metal working apparatus of the class described, a plurality of reciprocable spindle heads, each head including a prime mover and a tool driving mechanism actuated thereby, a frame for reciprocably supporting said heads, a work support positioned between said heads for receiving and supporting a work piece in position to be acted upon by tools driven by said heads, hydraulic mechanism for reciprocating said heads to move tools carried thereby toward and away from a supported work piece, hydraulic means for vertically shifting said work support, a hydraulic circuit control arrangement whereby upward movement is imparted to the work support prior to the association with the work supported thereby of tools driven by said spindle heads and whereby a variation in speed of movement of the spindle heads is also effected, said hydraulic circuit including control connections whereby the vertical movement of the work support controls the movement of both of said heads, and an electrical circuit arrangement whereby the actuation of the prime mover of at least one of said spindle heads is timingly controlled in accordance with the movements of said head.

2. In a metal working apparatus of the class described, a plurality of reciprocable spindle heads, each head including a prime mover and a tool driving mechanism actuated thereby, a frame for reciprocably supporting said heads, a work support positioned between said heads for receiving and supporting a work piece in position to be acted upon by tools driven by said heads, hydraulic mechanism for reciprocating said heads to move tools carried thereby toward and away from a supported work piece, hydraulic means for vertically shifting said work support, a hydraulic circuit control arrangement whereby upward movement is imparted to the work support prior to the association with the work supported thereby of tools driven by said spindle heads and whereby a variation in speed of movement of the spindle heads is also effected, said hydraulic circuit including control connections whereby the vertical movement of the work support controls the movement of both of said heads, an electrical circuit arrangement whereby the actuation of the prime mover of at least one of said spindle heads is timingly controlled in accordance with the movements of said head, and a single control mechanism for initiating the cycle of reciprocation of said spindle heads, the cycle of travel of the work support, and the actuation of the prime mover of one of said heads.

3. In a boring machine for machining a plurality of bores within an article of manufacture, a machine frame, a fixture associated therewith shiftable for clamping work in position and for thereafter moving the clamped work to a final position, rotary cutters disposed on opposite sides of said fixture and adapted to act on the article simultaneously from opposite sides thereof, power means for driving said rotary cutters, means for advancing said rotary cutters rapidly and simultaneously into position adjacent the article to be machined, control means for preventing advancement of a tool on one side of the article until the other tool has experienced a predetermined rapid advancement toward the article to enable the insertion of a tool within said article, means for stopping said rapid movement and for causing said rotary cutters to experience a feeding movement while machining the article, means for controlling the timed functioning of said shiftable fixture, and means for effecting the return of said rotary cutters to their starting position upon the completion of the machining operation.

4. In a boring machine for machining a plurality of bores within an article of manufacture, a machine frame, a fixture for clamping the work in position, rotary cutters disposed on opposite sides of said fixture and adapted to act on the article simultaneously from opposite sides thereof, power means for driving said rotary cutters, means for advancing said rotary cutters rapidly and simultaneously into position adjacent the article to be machined, means for indexing at least one of the cutters so as to secure said cutter in a predetermined circumferential position with respect to an aperture in the article for insertion within the article during the rapid advancing movement thereof, means for stopping said rapid movement and for causing said rotary cutters to experience a feeding movement while machining the article, and means for effecting the return of said rotary cutters to their starting position upon the completion of the machining operation.

5. In a device for machining a plurality of bores within an article of manufacture, a machine frame, a fixture for clamping the work in position, rotary cutters disposed on opposite sides of said fixture and adapted to act on the article simultaneously from opposite sides thereof, power means for driving said rotary cutters, means for advancing said rotary cutters rapidly and simultaneously into position adjacent the article to be machined, the work supporting fixture having slots to permit the passage of cutters therethrough to enable the operative engagement of said cutters with the work to be machined, means for securing at least one of the rotary cutters in an indexed position to enable the passage thereof through the slots in the fixture during the shifting of said cutter, means for stopping said rapid movement and for causing said rotary cutters to experience a feeding movement while machining the article, and means for effecting the return of said rotary cutters to their starting position upon the completion of the machining operation.

6. In a device for machining a bearing surface in a work piece, a reciprocable work support having a recess to permit the initial insertion of a preset rotary cutting tool within the work, a tool disposed in preset relation to said support, means for advancing the tool toward said support, means acting upon the tool to secure said tool in an indexed position to effect the registration of said tool with the recess in the work support, means for rendering said securing means functionally inoperable upon the completion of the initial advancement of the tool, means for effecting rotation of the tool for making a feeding cut, and means for arresting the rotation of the tool upon the completion of its machining operation to enable its withdrawal from the work.

7. In a device for machining bearing surfaces and the like, a work support provided with a plurality of guiding surfaces having longitudinal recesses therein to enable the entrance of a boring tool, a rotary boring tool having a laterally extending tool member, driving means for said boring tool, means for effecting the rapid advancement of said tool toward the work support, means for securing said tool in an indexed position during such advancement to insure the passage of the laterally extending tool member through the longitudinal recesses of said guiding surfaces, and control means for rendering said securing means functionally inoperative to enable the rotation of the tool upon the completion of its rapid advancement to enable the boring tool to machine the work piece.

8. In a boring machine, a bed, a spindle head reciprocable upon the bed for carrying rotary boring tools toward and away from a work piece, a boring tool carried by said head which includes a boring bar having a plurality of axially spaced outwardly projecting cutting elements, a work support including a frame and a vertically shiftable work carrier mounted on said frame, abutment means for temporarily arresting the upward movement of the work carrier when it reaches a predetermined position during its initial travel, whereby to so position a supported work piece having a plurality of axially spaced bearing surfaces to enable at least one of the projecting cutting elements to clear one of said bearing surfaces and thereby occupy a position to operatively engage another of said bearing surfaces, means for rendering said abutment means ineffective after the last mentioned cutting element has cleared a bearing surface, power mechanism for moving the head to impart axial travel to the boring tools, power mechanism for shifting said work carrier, and control mechanism for effecting automatic timed functioning of said power mechanisms.

9. In a boring machine, a bed, a spindle head reciprocable upon the bed for carrying rotary boring tools toward and away from a work piece, a boring tool carried by said head which includes a boring bar having a plurality of axially spaced outwardly projecting cutting elements, a work support including a frame and a vertically shiftable work carrier mounted on said frame, abutment means for temporarily arresting the upward movement of the work carrier when it reaches a predetermined position during its initial travel, whereby to so position a supported work piece having a plurality of axially spaced bearing surfaces to enable at least one of the projecting cutting elements to clear one of said bearing surfaces and thereby occupy a position to operatively engage another of said bearing surfaces, means for rendering said abutment means ineffective after the last mentioned cutting element has cleared a bearing surface, power mechanism for moving the head to impart axial travel to the boring tools, power mechanism for shifting said work carrier, means for preventing downward movement of the carrier until the boring tools have been completely withdrawn from the work, and control mechanism for effecting automatic timed functioning of said power mechanisms.

10. In a boring machine, a bed, a spindle head reciprocable upon the bed for carrying rotary boring tools toward and away from a work piece, a boring tool carried by said head which includes a boring bar having a plurality of axially spaced outwardly projecting cutting elements, a work support including a frame and a vertically shiftable work carrier mounted on said frame, abutment means for temporarily arresting the upward movement of the work carrier when it reaches a predetermined position during its initial travel, whereby to so position a supported work piece having a plurality of axially spaced bearing surfaces to enable at least one of the projecting cutting elements to clear one of said bearing surfaces and thereby occupy a position to operatively engage another of said bearing surfaces, means for rendering said abutment means ineffective after the last mentioned cutting element has cleared a bearing surface, power mechanism for moving the head to impart axial travel to the boring tools, power mechanism for shifting said work carrier, means for securing said projecting cutting elements in a predetermined circumferential position during the initial advancement thereof toward the supported work piece, and control mechanism for effecting automatic timed functioning of said power mechanisms.

11. In a boring machine, a bed, a spindle head reciprocable upon the bed for carrying rotary boring tools toward and away from a work piece, a boring tool carried by said head which includes a boring bar having a plurality of axially spaced outwardly projecting cutting elements, a work support including a frame and a vertically shiftable work carrier mounted on said frame, abutment means for temporarily arresting the upward movement of the work carrier when it reaches a predetermined position during its initial travel, whereby to so position a supported work piece having a plurality of axially spaced bearing surfaces to enable at least one of the projecting cutting elements to clear one of said bearing surfaces and thereby occupy a position to operatively engage another of said bearing surfaces, means for rendering said abutment means ineffective after the last mentioned cutting element has cleared a bearing surface, power mechanism for moving the head to impart axial travel to the boring tools, power mechanism for shifting said work carrier, means for securing said projecting cutting elements in a predetermined circumferential position during the initial advancement thereof toward the supported work piece, means for releasing said cutting elements from their secured position to permit rotation thereof as they approach the surfaces of the work piece which they are to machine, and control mechanism for effecting automatic timed functioning of said power mechanisms.

12. In a boring machine, a bed, a spindle head reciprocable upon the bed for carrying rotary boring tools toward and away from a work piece, a boring tool carried by said head which includes a boring bar having a plurality of axially spaced outwardly projecting cutting elements, a work support including a frame and a vertically shiftable work carrier mounted on said frame, abutment means for temporarily arresting the upward movement of the work carrier when it reaches a predetermined position during its initial travel, whereby to so position a supported work piece having a plurality of axially spaced bearing surfaces to enable at least one of the projecting cutting elements to clear one of said bearing surfaces and thereby occupy a position to operatively engage another of said bearing surfaces, means for rendering said abutment means ineffective after the last mentioned cutting element has cleared a bearing surface, hydraulic actuator mechanism for moving the head to impart axial travel to the boring tools, hydraulic actuator mechanism for shifting said work carrier, and control mechanism for effecting automatic timed functioning of said hydraulic actuator mechanisms.

13. A machine for simultaneously machining the crank shaft bearings and the cam shaft bearings of internal combustion engines comprising a work support on which the work rests in an inverted position, a hydraulic lift for elevating the work into a terminal working position, manually operable means for initiating the operation of said lift, a tool head for driving the machining tools, hydraulic means for translating said head to and from the work, means for momentarily stopping the work support before the same moves into its terminal working position, a control operable by the movement of the work support for causing the tool head to move toward the work with a rapid approach, means for changing the rate of movement of the tool head to feed the same during the machining operation, a control operable by the tool head during its rapid approach movement for causing the work support to move from its stop and pause position into its terminal working position and a control operable by the tool head at the completion of its feeding movement for causing the work support to return to its starting position and causing the tool head to move to its starting position with a rapid return movement.

14. In a machine for simultaneously machining the crank shaft bearings and the cam shaft bearings of internal combustion engines, comprising a work support, hydraulic means for clamping the work on said support, manually operable means for initiating the operation of said hydraulic clamping means, a tool head mounted for translation to and from the work support, a tool driving means in said head, hydraulic means for translating said head, means for starting the translation of the head at a rapid approach rate and change the rate to a feed during the machining operation, and means operable by the tool head at the completion of its feeding movement for causing the work support to unclamp the work and causing the tool head to move to its starting position.

15. In a machine tool, a work support including a vertically movable table and coacting depending clamping members, a hydraulic lift for elevating the work table into a terminal working position where the work is engaged by said clamping members, means for causing the table to stop and pause before moving into a terminal working position to permit a preparatory movement of the tool in the work, a tool head mounted for translation in a horizontal plane with a quick approach and feed movement toward the work and a quick return movement away from the work manually controlled means for initiating the operating cycles of the work support and the tool head and means operable automatically at predetermined stages in the operating cycles of the work support and tool head for controlling one by the relative position of the other.

16. In a machine tool organization, the combination of a work support, a tool head, a rotary tool driven from said head and having radially projecting teeth, a bearing on the work support for said tool having outwardly offset slots to admit the teeth on the tool when the tool enters the work, means for effecting a feed motion between the tool and work, a drive in the head for the tool, comprising a rotary drive transmitting shaft, means for controlling the drive transmitted through said shaft and means operable automatically in sequence with said controlling means for arresting the rotation of the shaft to bring the tool to rest with its teeth in alignment with the slots in said bearing, comprising a collar on said shaft having a peripheral opening therein and a locating pin movable into and out of said opening.

17. In metal working apparatus for boring a cylindrical surface of a work piece, a driving device for rotary tools, a rotary tool adapted to be driven by said device and having a radially projecting cutting member, a work supporting means relatively shiftable transversely with respect to said tool for governing the alignment of the tool and the cylindrical surface of a supported work piece, means for effecting the reciprocation of said driving device to carry the rotary tool toward and away from the work piece, and means for automatically locating and maintaining said projecting member in a predetermined radial position during a predetermined interval of its reciprocation, whereby to enable said projecting cutter member to clear the work during said interval of its reciprocation.

18. In metal working apparatus for boring a cylindrical surface of a work piece, a driving device for rotary tools, a tool adapted to be driven by said device having a radially projecting cutting element, means for supporting a work piece in position to be acted upon by the tool and relatively shiftable transversely thereof to govern the alignment of the tool and the cylindrical surface of the work, means for imparting reciprocation to said driving device, and latch means for circumferentially locating and maintaining said projecting element in a predetermined radial position during an interval of the reciprocation thereof whereby to permit the projecting cutting element to clear the work during said interval of its reciprocation.

19. In metal working apparatus for boring a cylindrical surface of a work piece, a driving device for rotary tools, a rotary tool adapted to be driven by said device and having a cutting member radially projecting therefrom, a work supporting means relatively shiftable transversely of said tool to govern the alignment of the tool and the cylindrical surface of the work, means for effecting the reciprocation of said driving device to carry the rotary tool toward and away from the work piece, means for locking and maintaining the tool eccentrically in a predetermined circumferential position, whereby to enable said cutting member to clear the work during said interval of its reciprocation, and means for controlling the functioning of said tool locking means in timed relation with the reciprocation of said tool.

20. In a boring machine for machining a cylindrical surface in a work piece, a spindle head including a prime mover and a rotary tool driving means actuated thereby, means for reciprocably supporting said spindle head, a boring bar adapted to be driven by said tool driving means, work supporting means shiftable from one position to another to eccentrically locate the cylindrical surface of the work with respect to said boring bar and thereby enable the movement of the boring bar through the work without causing a cutting action thereon, hydraulic mechanism for reciprocating the spindle head toward and away from the supported work piece, hydraulic means for shifting said work support, and control means for said last mentioned actuator to govern the shifting of the work support for eccentrically positioning the cylindrical surface of the supported work piece with respect to said boring bar so that the boring bar may be axially moved within the work piece without making a cut and to govern a shifting of the support to clamp and position said work piece to be acted upon by the boring bar.

21. In a boring machine for machining a cylindrical surface in a work piece, a spindle head including a prime mover and a rotary tool driving means actuated thereby, means for reciprocably supporting said spindle head, a boring bar having a radially projecting cutting member adapted to be driven by said tool driving means, work supporting means shiftable from one position to another to eccentrically locate the cylindrical surface of the work with respect to said boring bar and thereby enable the movement of the boring bar through the work without causing a cutting action thereon, hydraulic mechanism for reciprocating the spindle head toward and away from a supported work piece, hydraulic means for shifting said work support, and control means for said last mentioned actuator automatically operable in timed relation with respect to the reciprocation of the spindle head to govern the shifting of the work support to the position in which the boring bar may be moved within the work piece without making a cut on the cylindrical surface thereof and to govern the shifting of the support to clamp and position said work piece to be acted upon by the boring bar.

22. In metal working apparatus of the class described, a plurality of driving devices for reciprocable rotary tools, means for reciprocably supporting said devices, a hydraulic actuator coupled with each device for imparting reciprocation thereto, a work supporting means shiftable in timed relation with the movement of said rotary tools for automatically clamping and releasing a work piece in position to be acted upon by tools driven by said devices, and a hydraulic circuit arrangement including pumping means for effecting the movement of said devices at various speeds, said circuit being constructed and arranged to impart positive proportional actuation to both driving devices at all speeds thereof irrespective of variation in load resistance individually encountered by said devices.

23. In metal working apparatus of the class described, a plurality of driving devices for reciprocable rotary tools, means for reciprocably supporting said devices, a hydraulic actuator coupled with each device for imparting reciprocation thereto, a work supporting means for clamping and releasing a work piece in position to be acted upon by tools driven by said devices, said work supporting means being shiftable in timed relation with the movement of said rotary tools to automatically clamp the work in position, a hydraulic circuit connected with said actuators, said circuit including pumping means for effecting the movement of said devices at various speeds, said hydraulic circuit being constructed and arranged to impart positive proportional shifting to both devices at all speeds thereof irrespective of variations in load resistance individually encountered by said devices, and control means for said circuit, whereby rapid traverse and feeding speeds may be imparted at predetermined intervals to said tool driving devices.

24. In metal working apparatus of the class described, a plurality of driving devices for rotary tools including prime movers, means for reciprocably supporting said devices, a work support automatically shiftable in timed relation to the movement of said devices for clamping and releasing a work piece in position, a hydraulic mechanism for shifting said support, and a hydraulic mechanism for reciprocating each of said tool driving devices, said hydraulic mechanisms being connectible within a circuit common to both hydraulic mechanisms, and both said devices being hydraulically connected in series relation so as to impart positive proportional shifting to both driving devices irrespective of the variation in load resistance individually encountered by said devices.

25. In metal working apparatus of the class described for boring a cylindrical surface in a work piece, a driving device for rotary tools, a plurality of tools each having a laterally projecting cutter driven by said device, said device including a prime mover and rotary tool driving elements coupled therewith, means for reciprocably supporting said driving device, a work support shiftable into a plurality of positions prior to the operative engagement of said cutters with the work piece for eccentrically positioning the cylindrical surface of said work piece to be acted upon by said cutters rotated and reciprocated by said driving device, means for reciprocating said driving device, means for locating at least one of said cutters in a predetermined radial position during an interval of its cycle of reciprocation when said cylindrical surface is eccentrically positioned, and control means for effecting the actuation of said prime mover during a predetermined interval of the reciprocation of the driving device and for arresting said prime mover during another predetermined portion of the cycle of reciprocation.

26. In metal working apparatus of the class described for boring a cylindrical surface in a workpiece, a driving device for rotary tools, a plurality of tools each having a laterally projecting cutter driven by said device, said device including a prime mover and rotary tool driving elements coupled therewith, means for reciprocably supporting said driving device, a work support for positioning the cylindrical surface of said work piece in one position to be acted upon by said tools rotated and reciprocated by said driving device and in another position eccentrically to permit clearance of the tools, means for reciprocating said driving device, means for locating at least one of said cutters in a predetermined radial position during an interval of its cycle of reciprocation when said cylindrical surface is eccentrically positioned, means for varying the speed of reciprocation of the driving means so as to effect a rapid traverse during a predetermined portion of its reciprocation and a slower feeding movement during another portion of its reciprocation, and control means for effecting the actuation of the prime mover only during the feeding movement of said driving device.

27. In a boring machine for machining a plurality of cylindrical bores within an article of manufacture, a machine frame, a shiftable fixture associated therewith for clamping work, rotary tools each having a laterally projecting cutter disposed on opposite sides of said fixture and adapted to act on the article simultaneously from opposite sides thereof, power means for driving said rotary tools, means for advancing said rotary tools rapidly and simultaneously into position adjacent the article to be machined, means for stopping said rapid movement and for causing a feeding movement of said tools while machining the article, said fixture being shiftable transversely of said tools from one position to another to eccentrically position the bore of said article with respect to said rotary tools and thereby enable the movement of a tool through the work eccentrically thereof to preclude a cutting action, means for controlling the timed shifting of said fixture, and means for effecting the return of said rotary tools to their starting position upon the completion of the machining operation.

28. In a boring machine for machining a plurality of cylindrical bores within an article of manufacture, a machine frame, a shiftable fixture associated therewith for clamping work, rotary tools each having a laterally projecting cutter disposed on opposite sides of said fixture and adapted to act on the article simultaneously from opposite sides thereof, an electrical prime mover coupled with each of said tools and movable therewith as a unit, means for advancing said rotary tools rapidly and simultaneously into position adjacent the article to be machined, means for stopping said rapid movement and for feeding said rotary tools while machining the article, said fixture being shiftable transversely of said tools from one position to another to eccentrically position the bore of said article with respect to said rotary tools and thereby enable the movement of a tool through the work eccentrically thereof to preclude a cutting action, means for controlling the timed shifting of said fixture, and means for effecting the return of said rotary tools to their starting position upon the completion of the machining operation.

29. In a boring machine for machining a cylindrical surface of a work piece, a work support, a boring tool disposed in preset relation with respect to said support, means for rotating said boring tool, said boring tool having a radially disposed cutting element, power means for advancing said tool toward the support to effect a cutting operation upon the work, said tool and work support being relatively shiftable transversely of each other to effect the eccentric positioning of the tool and the cylindrical surface of said work to enable a movement of the cutting element through the work without a cutting action, means operable automatically upon the completion of the machining operation to secure the cutting element of the boring tool in a predetermined radial position, and means for effecting a reversal of the tool when said tool has been secured in said position.

30. In a device for machining bearing surfaces and the like, a work support automatically shiftable for clamping and to move a supported work piece from one position to another, a rotary cutting tool adapted to be rotated and advanced toward said support, said tool including a radially projecting cutter element, means for advancing the tool at a relatively high speed without imparting rotation thereto, means governed by the arrival of the tool at a preset position to effect the rotation thereof for cutting purposes, means governed upon the completion of the cutting operation to effect a rapid return movement to the tool, and control means operable to automatically govern the shifting of the work support and to arrest the rotation of said tool subsequent to the initial shifting of the work support with said cutter element occupying a preselected angular position with respect to a bearing surface of the work.

31. In a device for machining bearing surfaces and the like, a pair of oppositely disposed heads equipped with electrical prime movers shiftable as a unit therewith and having means for driving a rotary cutting tool, means for reciprocably supporting said heads, an actuator coupled with each head, driving means operable independently of the electrical prime movers for supply power to said actuators, means for controlling the activation of the electrical prime movers, means for controlling the rate and direction of movement of said actuators, a work support positioned between said heads and shiftable from one position to another transversely of said tool to eccentrically position a bearing surface of the work with respect to said rotary tool and thereby enable the movement of the tool through the work without causing a cutting action thereon and in another position to concentrically position said bearing surface and tool to permit the tool to cut into the work, and electrical control means for governing the individual control of said electrical prime movers independently of the means for driving said actuators whereby rotation of at least one of said tools may be arrested before said tool is withdrawn from the work.

32. In a machine for boring a plurality of aligned bearings in a work piece, a reciprocable tool spindle, a boring tool provided with a lateral projecting cutter, means for reciprocably supporting said spindle and tool, a hydraulic actuator coupled with the spindle for imparting reciprocation thereto, a work supporting carriage shiftable transversely of the tool for locating the workpiece in two definite positions with respect to the spindle, means for controlling reciprocation of the spindle, the shifting of the carriage and the rotation of the tool to cause the cutter to clear one of said bores and thereafter shift the carriage in a second position whereat the cutter machines another of said bores.

33. In a machine for boring a plurality of aligned bearings in a work piece, a reciprocable tool spindle, a boring tool provided with a lateral projecting cutter, means for reciprocably supporting said spindle and tool, an actuator coupled with the spindle for imparting reciprocation thereto, a work supporting carriage shiftable transversely of the tool for locating the work piece in two definite positions with respect to the spindle, means for controlling reciprocation of the spindle, the shifting of the carriage and the rotation of the tool to cause the cutter to clear one of said bores and thereafter shift the carriage in a second position whereat the cutter machines another of said bores.

34. In a metal working machine for machining a cylindrical surface of a work piece, a reciprocable tool spindle, a rotatable tool carried thereby, a work support shiftable transversely of the tool, hydraulic means for shifting the support from a normal inoperative position with the cylindrical surface of the work eccentric to the tool to another position wherein the cylindrical surface of the work is concentric with the axis of the tool, stop means for stopping the support as it reaches the first of said plurality of positions, said stop means comprising an abutment and a linkage for controlling the positioning thereof, and means for releasing said stop means, said last named means being controlled by movement of the tool spindle.

35. In metal working apparatus for boring cylindrical surfaces in a work piece, a plurality of tool spindles, a plurality of reciprocable driving devices for supporting said spindles, tools carried by said spindles, at least one of said tools having a laterally projecting cutter, means for reciprocably supporting said devices, power means coupled with each device for imparting reciprocation thereto, a work supporting carriage for locating a work piece in at least two definite positions with respect to said spindles and shiftable transversely thereof, and means for controlling the reciprocation of said spindles, the shifting of the carriage, and the angular positioning of one of said spindles to effect the clearance of one of said cutters with respect to one of said cylindrical surfaces during an interval of its cycle of reciprocation.

36. In metal working apparatus for boring cylindrical surfaces in a work piece, a plurality of tool spindles, a plurality of reciprocable driving devices for supporting said spindles, tools carried by said spindles, at least one of said tools having a laterally projecting cutter, means for reciprocably supporting said devices, hydraulic power means coupled with each device for imparting reciprocation thereto, a work supporting carriage for locating a work piece in at least two definite positions with respect to said spindles and shiftable transversely thereof, and means for controlling the reciprocation of said spindles, the shifting of the carriage, and the angular positioning of one of said spindles to effect the clearance of one of said cutters with respect to one of said cylindrical surfaces during an interval of its cycle of reciprocation.

37. In metal working apparatus for boring cylindrical surfaces in a work piece, a plurality of tool spindles, a plurality of reciprocable driving devices for supporting said spindles, tools carried by said spindles, at least one of said tools having a laterally projecting cutter, means for reciprocably supporting said devices, power means coupled with each device for imparting reciprocation thereto, a work supporting carriage for locating a work piece in at least two definite positions with respect to said spindles and shiftable transversely thereof, means for controlling the reciprocation of said spindles, the shifting of the carriage, and the angular positioning of one of said spindles to effect the clearance of one of said cutters with respect to one of said cylindrical surfaces during an interval of its cycle of reciprocation, clamping means for automatically securing said work piece to said carriage prior to the machining thereof, and means operable as an incident to the completion of the machining operation to automatically effect the release of said clamping means.

38. In a metal working apparatus for boring a cylindrical surface and the like, a spindle support, a rotary spindle in said support for carrying a tool having a lateraly projecting cutter, a work supporting carriage shiftable relatively transversely of said spindle for locating a work piece in at least two definite positions with respect to the axis of said spindle, power means for effecting relative reciprocation between said work support and said spindle in a direction parallel to the spindle axis, and means for controlling said relative reciprocation, the shifting of the carriage transversely of the spindle, and the angular position of said spindle to effect the clearance of said cutter with respect to said cylindrical surface during an interval of said relative reciprocation.

39. In metal working apparatus for boring a cylindrical surface and the like, a spindle support, a rotary spindle in said support for carrying a tool having a laterally projecting cutter for machining the surface, a work supporting carriage shiftable relatively transversely of said spindle for locating a work piece in at least two definite positions with respect to said spindle, hydraulic power means for effecting relative reciprocation between said work support and said spindle in a direction parallel to the spindle axis, and means for controlling said relative reciprocation, the shifting of the carriage transversely of the spindle, and the angular position of said spindle to effect the clearance of said cutter with respect to said cylindrical surface during an interval of said relative reciprocation.

40. In a machine tool, a spindle support, a rotary spindle in said support for carrying a cutter, a work holder adapted to carry a work piece, power means for effecting relative movement between the work holder and the spindle support transversely of the spindle axis to move the work from normal inoperative position into at least two positions in operative juxtaposition to the spindle axis, power means for effecting relative reciprocation between said work holder and said spindle support axially of the spindle, means for initiating movement of said last named power means as the work support moves to the first of said two operative positions, means for effecting further movement of said last named power means to effect a machining operation as the work support moves to the second of said operative positions, means for clamping the work to the work holder in said second position, and means operable as an incident to the completion of the machining operation to automatically effect the return of the work support to normal inoperative position.

41. In a machine tool, a spindle support, a rotary spindle in said support for carrying a cutter, a work holder adapted to carry a work piece, hydraulic power means for effecting relative movement between the work holder and the spindle support transversely of the spindle axis to move the work from normal inoperative position into at least two positions in operative juxtaposition to the spindle axis, hydraulic power means for effecting relative reciprocation between said work holder and said spindle support axially of the spindle, means for initiating movement of said last named hydraulic power means as the work support moves to the first of said two operative positions, means for effecting further movement of said last named hydraulic power means to effect a machining operation as the work support moves to the second of said operative positions, means for clamping the work to the work holder in said second position, and means operable as an incident to the completion of the machining operation to automatically effect the return of the work support to normal inoperative position.

42. In metal working apparatus for boring a cylindrical surface in a work piece, a rotary spindle, a reciprocable driving device for said spindle, a tool having a laterally projecting cutter carried by said spindle, means for reciprocably supporting said device, power means coupled with said device for imparting reciprocation thereto, a work supporting carriage for locating a work piece in at least two definite positions with respect to said spindle and shiftable transversely thereof, and means for controlling the reciprocation of said spindle, the shifting of the carriage, and the angular positioning of said spindle to effect the clearance of said cutter with respect to said cylindrical surface during an interval of its reciprocation.

43. In boring apparatus, a driving device for a rotary spindle, a spindle driven by said device adapted to carry a tool having a laterally projecting cutter, a work supporting means, means for shifting the work supporting means and the tool spindle relatively transversely of the tool to govern the alignment of the tool and the work, means for shifting the tool spindle and work supporting means relatively axially of the tool to govern the operative engagement of the tool with the work, means for locking the tool spindle in predetermined angular position, and interlocking control connections between the means for shifting the tool spindle and work supporting means relatively axially of the tool and the locking means whereby said shifting means cannot operate in a given manner unless said locking means is in position to hold the spindle in said predetermined angular position.

44. In a boring machine, a rotary boring spindle, a boring tool projecting laterally at one end of said spindle, means for rotating said spindle, means for stopping the rotation of the spindle with the tool projecting in a predetermined radial direction, a work support, means for procuring relative transverse movement between the spindle and support in a direction such that the spindle axis is displaced from the axis of the bore of the work piece in a direction opposite the projection of the tool, and means for procuring relative reciprocative movement between the support and the spindle parallel with the axis of the spindle while the spindle is in displaced position whereby to permit the passing of the tool through the bore of the work piece wthout contacting the same.

JOHN S. BARNES.
PAUL R. GUIRL.

DISCLAIMER 2,042,379.—*John S. Barnes* and *Paul R. Guirl*, Rockford, Ill. METALWORKING APPARATUS. Patent dated May 26, 1936. Disclaimer filed September 24, 1943, by the assignee, *Odin Corporation*.

Hereby enters this disclaimer to claims 17, 18, 19, 20, 29, 38, 39, 42, 43 and 44.

[*Official Gazette October 26, 1943.*]